(12) United States Patent
Kawakami

(10) Patent No.: US 9,091,902 B2
(45) Date of Patent: Jul. 28, 2015

(54) FOCAL PLANE SHUTTER FOR CAMERA

(75) Inventor: Kenta Kawakami, Saitama (JP)

(73) Assignee: NIDEC COPAL CORPORATION, Tokyo (JP)

( * ) Notice: Subject to any disclaimer, the term of this patent is extended or adjusted under 35 U.S.C. 154(b) by 0 days.

(21) Appl. No.: 13/283,992

(22) Filed: Oct. 28, 2011

(65) Prior Publication Data
US 2012/0106945 A1    May 3, 2012

(30) Foreign Application Priority Data

Oct. 29, 2010  (JP) .................................. 2010-243832

(51) Int. Cl.
*G03B 9/08* (2006.01)
*G03B 9/20* (2006.01)

(52) U.S. Cl.
CPC ... *G03B 9/20* (2013.01); *G03B 9/08* (2013.01)

(58) Field of Classification Search
USPC ......... 396/449, 452, 471, 479–488, 497, 505, 396/509, 510
See application file for complete search history.

(56) References Cited

U.S. PATENT DOCUMENTS

| | | | |
|---|---|---|---|
| 8,408,823 B2 * | 4/2013 | Kawakami et al. | 396/456 |
| 8,727,646 B2 * | 5/2014 | Ai et al. | 396/469 |
| 2009/0238554 A1 * | 9/2009 | Niwamae | 396/484 |

FOREIGN PATENT DOCUMENTS

| | | |
|---|---|---|
| JP | 2004-264468 | 9/2004 |
| JP | 2007-298544 | 11/2007 |
| JP | 2008-164805 | 7/2008 |
| JP | 2008-216484 | 9/2008 |

* cited by examiner

*Primary Examiner* — Clayton E Laballe
*Assistant Examiner* — Minh Phan
(74) *Attorney, Agent, or Firm* — Troutman Sanders LLP

(57) ABSTRACT

A first blade includes two arms and four blades, and is arranged between a shutter base plate and an intermediate plate. A second blade includes two arms and four blades, and is arranged between the intermediate plate and an auxiliary base plate. During an exposure operation, the four blades of the first blade are brought into an overlap state from a development state and the four blades of the second blade are brought into the development state from the overlap state. Since a contour forming edge of the intermediate plate above the opening portion is formed in the shape of an arc, the four blades of the second blade are able to start an operation appropriately from the overlap state.

5 Claims, 11 Drawing Sheets

FOCAL PLANE SHUTTER FOR CAMERA

CROSS-REFERENCE TO RELATED APPLICATION

This application claims priority under 35 U.S.C. §119 to Japanese Application No. 2010-243832 filed Oct. 29, 2010.

BACKGROUND OF THE INVENTION

1. Technical Field

The present invention relates to a focal plane shutter for a camera including two shutter blades having a plurality of blades.

2. Description of the Related Art

Among focal plane shutters for a camera, a focal plane shutter including two shutter blades referred to as a first blade and a second blade is known and is adopted not only in digital cameras but also in silver salt film cameras. However, this type of focal plane shutter forms two blade chambers by partitioning the space between a shutter base plate and an auxiliary base plate (also referred to as a cover plate or the like) with an intermediate plate (referred to as a partition plate or the like), and two shutter blades are separately arranged in the blade chambers.

Both of the two shutter blades include two arms having one end of each arm individually and pivotally attached to the shutter base plate, and a plurality of blades having one longitudinal end of each blade pivotally supported in order on both the arms toward the free ends of the arms. In the blade chamber, the plurality of blades are arranged closer to the intermediate plate than the two arms. Therefore, both the shutter blades are pivotally supported on a first pivotally attached portion of the two arms, or always come in contact with the intermediate plate. When the shutter blade retreats from the exposure opening, the amount of mutual overlap between the plurality of blades is increased to bring about an overlap state, and when the shutter blade covers the exposure opening, the amount of mutual overlap between the plurality of blades is reduced to bring about the development state.

When the two shutter blades having such a configuration perform an exposure operation, first, a first shutter blade in the development state is made to start an operation so as to open the exposure opening, and then, a second shutter blade in the overlap state is made to start an operation in the same direction so as to cover the exposure opening, and a slit is formed between the slit forming blades to expose an imaging surface. However, it is known that a spring or motor is used as a drive source when performing the exposure operation.

One of them, that is, a case in which a spring is used as the drive source is configured such that a first driving member which links a driving pin to one of the arms of the first shutter blade is rotated by the urging force of a first driving spring, and a second driving member which links a driving pin to one of the arms of the second shutter blade is rotated by the urging force of a second driving spring. However, there are a direct type and a locking type according to a difference in type in which the first driving member and second driving member are held in a state immediately before the start of the exposure operation. JP-A-2008-216484 describes a direct type focal plane shutter having such a configuration, and JP-A-2008-164805 describes a locking type focal plane shutter.

In the case of the focal plane shutter which performs the exposure operation using a spring as the drive source in this way, even in the direct type or even in the locking type, it is known that not only the second shutter blade but also the first shutter blade is brought into the overlap state before photographing so as to fully open the exposure opening and allow the image of a subject to be photographed to be observed with a monitor via an imaging element, and if a release button is pushed when photographing is performed, the first shutter blade is brought into the development state from the overlap state, and then the exposure operation is performed as described above. JP-A-2007-298544 describes a direct type focal plane shutter configured in this way.

On the other hand, as a case where a motor is used as the drive source, it is known that an output pin (driving pin) integral with a rotor of a first motor is linked to one of the arms of the first shutter blade, and an output pin (driving pin) of a rotor of a second motor is linked to one of the arms of the second shutter blade. JP-A-2004-264468 describes a focal plane shutter configured in this way as a second example.

The focal plane shutter of this configuration can operate the first shutter blade to the overlap state from the development state and operate the second shutter blade to the development state from the overlap state whenever photographing is performed in an exposure operation. Besides, the focal plane shutter can operate the second shutter blade to the overlap state from the development state and operate the first shutter blade to the development state from the overlap state, in the next photographing operation, in a case where the first shutter blade is operated to the overlap state from the development state and the second shutter blade is operated to the development state from the overlap state in the previous photographing operation.

The focal plane shutter of this configuration brings not only the second shutter blade but also the first shutter blade into the overlap state before photographing so as to fully open the exposure opening and allow the image of a subject to be photographed to be observed with a monitor via an imaging element, and if a release button is pushed when photographing is performed, any one of the first shutter blade and the second shutter blade is brought into the development state from the overlap state, and then the exposure operation can be performed as described above, or if the release button is pushed when photographing is performed, the first shutter blade and the second shutter blade are alternately brought into the development state from the overlap state whenever photographing is performed, and then the exposure operation can be performed as described above. The present invention relates to a focal plane shutter including two shutter blades which is adapted such that a shutter blade in the overlap state is operated to the development state immediately after the release button is pushed when photographing is performed.

SUMMARY OF THE INVENTION

Meanwhile, since cameras have recently been miniaturized and made slim, miniaturization and slimming of the focal plane shutter are also required. As part of such miniaturization and slimming, it is required that the dimension of the operating space of the shutter blades in the thickness direction (direction along the optical axis) should also be made as small as possible. Therefore, although the thickness of each plate member which forms each blade chamber, or the thickness of components of the shutter blades are also made as small as possible, it is now a matter of necessity to make the space interval between two blade chambers configured between the shutter base plate and the auxiliary base plate small. However, if the space interval between the blade chambers is made too small, the frictional resistance force between the blades and the frictional resistance force between a blade and three plate members (the shutter base plate, the intermediate plate, and the auxiliary base plate) are no longer obtained uniformly from the relationship of processing allowance or the like. As a result, when a shutter blade in the overlap state is operated, an operation cannot be appropriately started, and the timing at which the exposure opening begins to close, and the posture of the blade (slit forming blade) when the exposure opening begins to close is apt to fluctuate.

If such a phenomenon occurs, in the case of the focal plane shutter described in JP-A-2008-216484 and JP-A-2008-164805, a problem occurs in that exposure time is no longer stably obtained during high-speed photographing, or unevenness of exposure is caused. As in the focal plane shutter described in JP-A-2007-298544, in the case of the focal plane shutter which is configured such that the image of a subject to be photographed is allowed to be observed with the monitor via the imaging element before photographing, as described above, the exposure time is no longer stably obtained, and unevenness of exposure is caused. Besides, a problem occurs in that the time until photographing is actually started by the first blade after the release button of the camera is pushed is unavoidably prolonged more than needed, and a moving subject is not easily photographed in an intended state.

The invention has been made in order to solve such a problem, and the object thereof is to provide a focal plane shutter for a camera including two shutter blades suitable for miniaturization which is adapted such that a shutter blade including two arms having one end of each arm pivotally attached to a shutter base plate, and a plurality of blades having one longitudinal end of each blade pivotally supported in order on both the arms toward the free ends of the arms, can stably start an operation from an overlap state immediately after a release button of a camera is pushed.

In order to achieve the above object, an aspect of the invention provides the following arrangements.

(1) A focal plane shutter for a camera, comprising:
a shutter base plate having an opening portion for a photographing path;
an auxiliary base plate having an opening portion for the photographing path and attached to the shutter base plate at a predetermined interval;
an intermediate plate which is arranged between the shutter base plate and the auxiliary base plate to form a first blade chamber between the intermediate plate and the shutter base plate and form a second blade chamber between the intermediate plate and the auxiliary base plate, the intermediate plate having an opening portion for the photographing path, wherein at least one of the opening portions of the shutter base plate, the auxiliary base plate and the intermediate plate forms an oblong exposure opening, and wherein the intermediate plate defines first and second regions extending along long sides of the exposure opening, respectively, and third and fourth regions extending along short sides of the exposure opening, respectively;
a first shutter blade which is arranged in the first blade chamber and includes a plurality of first blades for opening and closing the exposure opening, the plurality of first blades being overlapped with each other to be substantially parallel to the long side of the exposure opening in the first region of the intermediate plate when the exposure opening is opened; and
a second shutter blade which is arranged in the second blade chamber and includes a plurality of second blades for opening and closing the exposure opening, the plurality of second blades being overlapped with each other to be substantially parallel to the long side of the exposure opening in the second region of the intermediate plate when the exposure opening is opened, wherein the intermediate plate is formed such that at least one of two contour forming edges outside the first and second regions has a substantially chevron shape toward the exposure opening, and a portion of one of the first and second regions having the chevron shape is not overlapped with the plurality of overlapped blades.

(2) The focal plane shutter according to (1),
wherein at least one of the two contour forming edges of the first and second regions is formed in the shape of an arc which is convex toward the exposure opening.

(3) The focal plane shutter according to (1), wherein
the first shutter blade includes two first arms each of which is pivotally attached to the shutter base plate in the third or the fourth region of the intermediate plate,
the first blades are arranged closer to the intermediate plate than the first arms and each of the first blades is pivotally supported by the first arms,
the second shutter blade includes two second arms each of which is pivotally attached to the shutter base plate in the third or the fourth region of the intermediate plate, and
the second blades are arranged closer to the intermediate plate than the second arms and each of the second blades is pivotally supported by the second arms.

The intermediate plate which partitions the space between the shutter base plate and the auxiliary base plate is formed in a shape such that at least one of the contour forming edges outside the two long sides of the oblong exposure opening cuts off a portion of the intermediate plate toward the exposure opening. Thus, a portion of the region outside the long side of the exposure opening does not overlap the plurality of blades in the overlap state. Therefore, there is a feature that, even if the interval between the shutter base plate and the auxiliary base plate is smaller than that in the related art, the operation of the plurality of blades can be stably started when photographing is performed.

DETAILED DESCRIPTION OF EXEMPLARY EMBODIMENTS

An exemplary embodiment will be described with reference to the accompanying drawings. As long as the invention is applied to a focal plane shutter including two shutter blades which includes a plurality of blades, it is possible to adopt any type of configuration. However, the exemplary embodiment is configured as a locking type focal plane shutter similar to the focal plane shutter described above in JP-A-2008-164805.

First Embodiment

Figure 1:
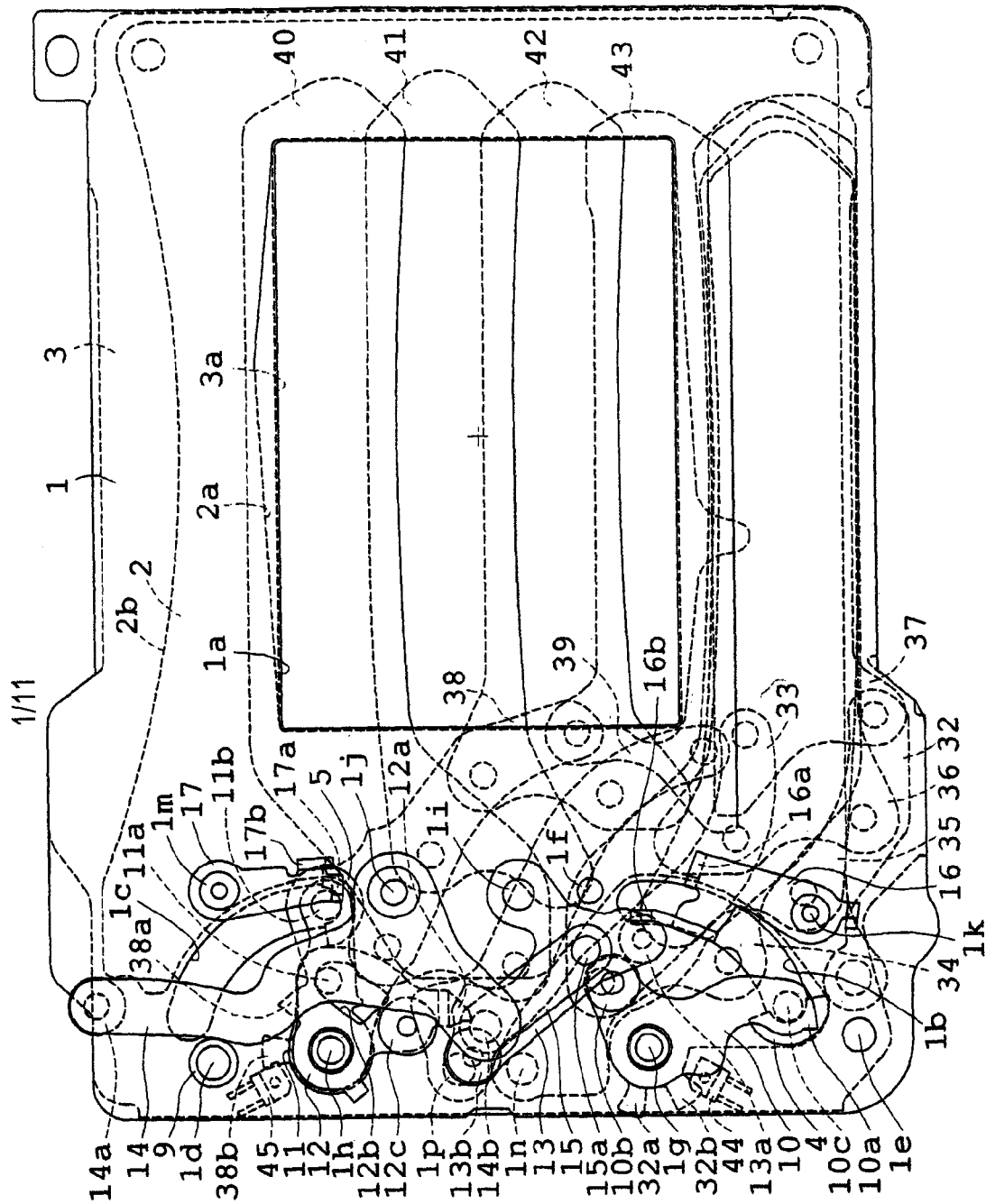
FIG. 1 is a plan view showing a state immediately after the end of an exposure operation, and mainly showing only components of an opening and closing drive mechanism arranged near a shutter base plate with respect to a control mechanism of shutter blades.
Figure 2:
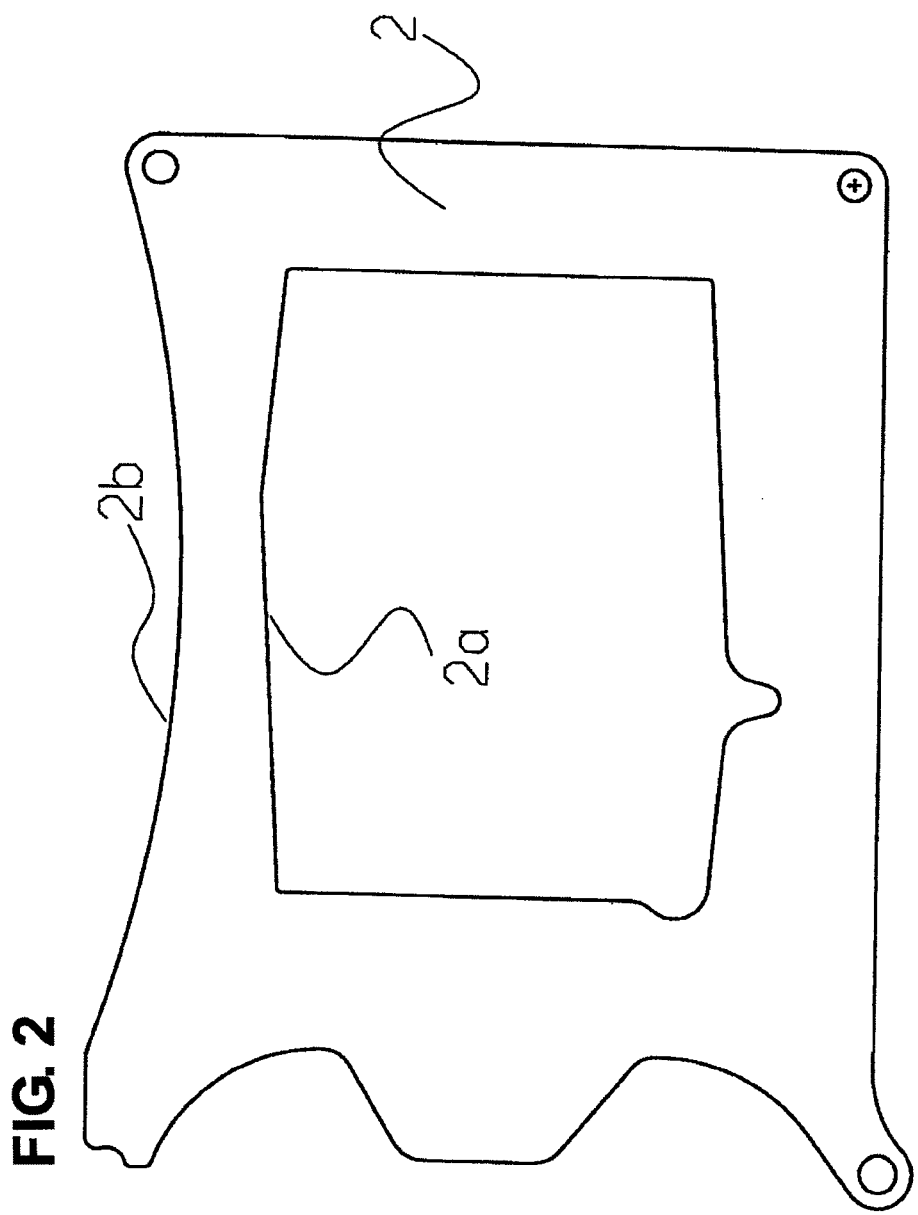
FIG. 2 is a plan view showing a single part of an intermediate plate.
Figure 3:
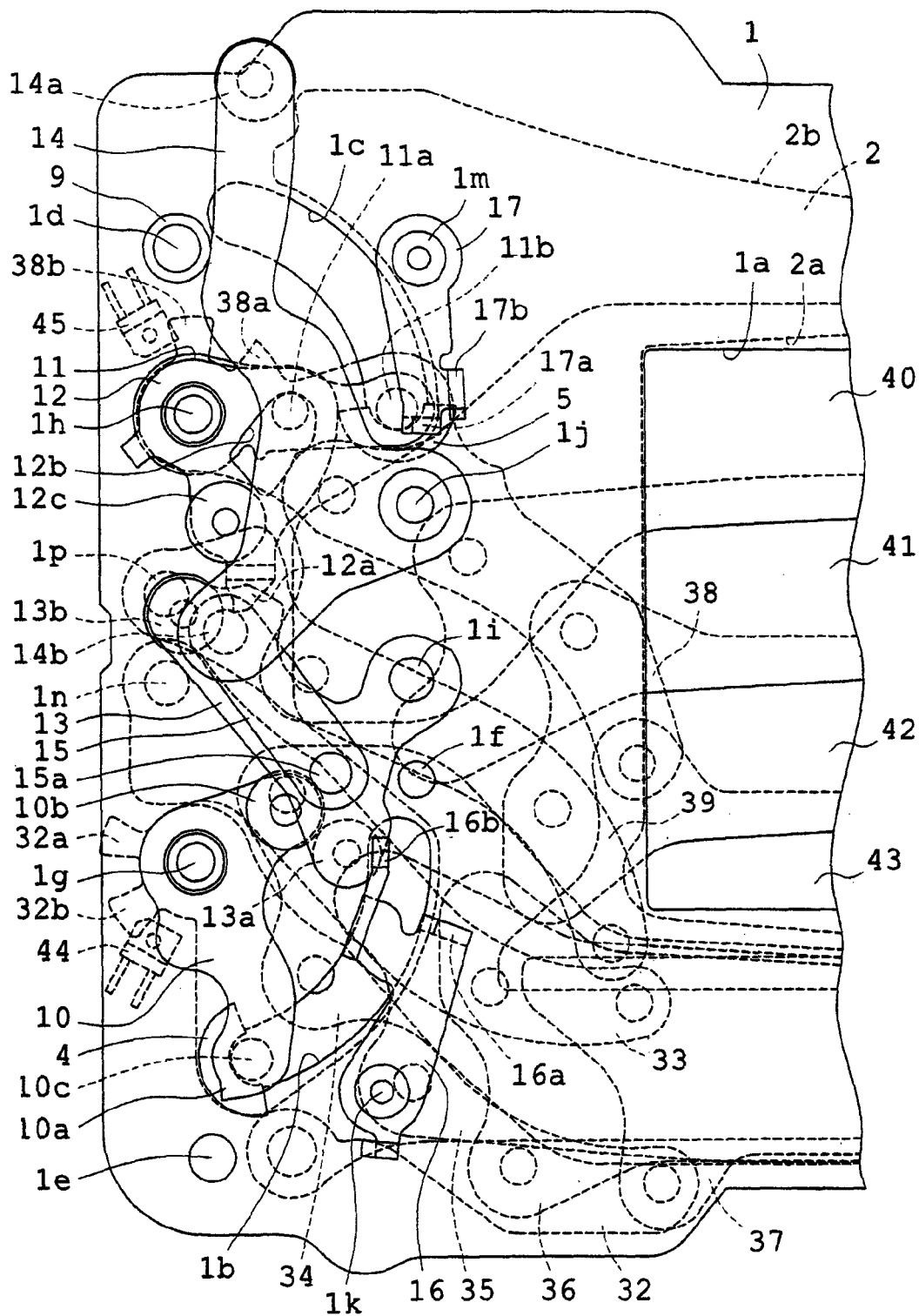
FIG. 3 is an enlarged plan view showing only approximately a left half in FIG. 1.
Figure 4:
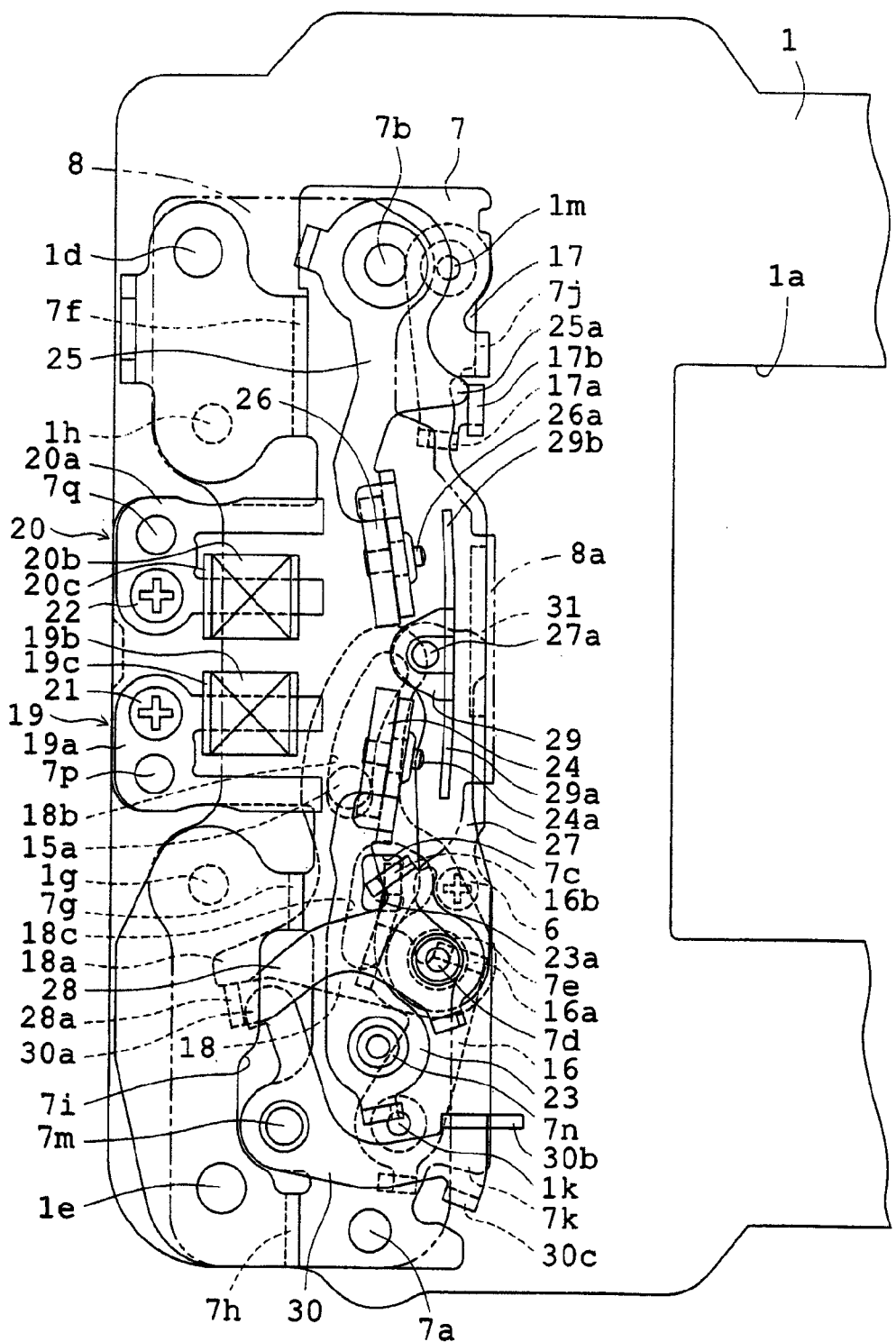
FIG. 4 is a plan view showing a state immediately after the end of an exposure operation, and showing components of an unlocking mechanism arranged in a place apart from the shutter base plate more than the opening and closing drive mechanism shown in FIG. 3 so as to overlap the opening and closing drive mechanism.
Figure 5:
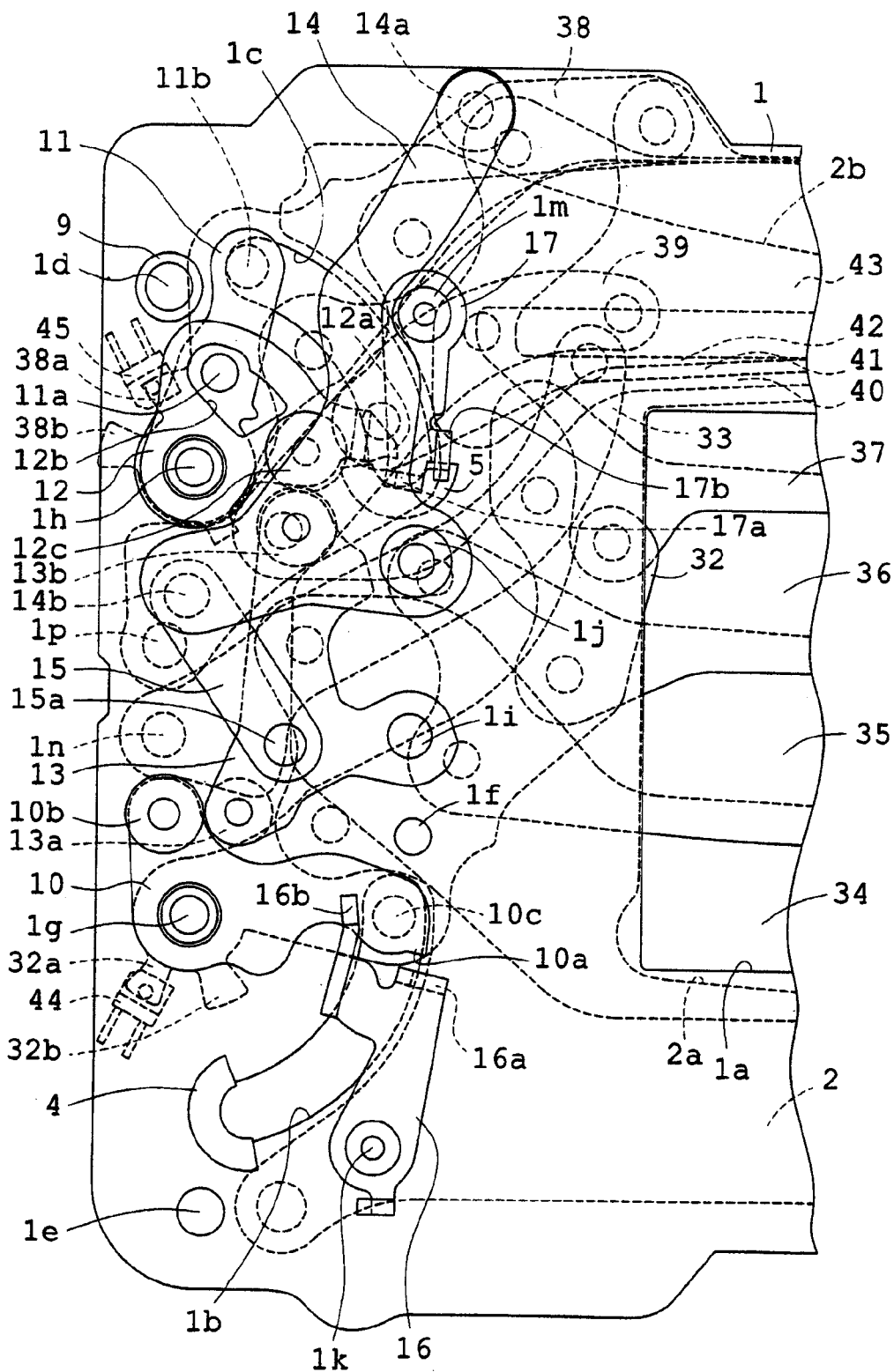
FIG. 5 is a plan view showing an oversetting state of the opening and closing drive mechanism shown in FIG. 3.

First, the configuration of the first embodiment will mainly be described with reference to FIGS. 1 to 4. All of FIGS. 1, 3 and 4 are plan views showing a state immediately after the end of an exposure operation. FIG. 1 also shows the configuration of two shutter blades arranged on the rear surface side of a shutter base plate by broken lines. However, FIG. 1 shows only components of an opening and closing drive mechanism arranged near the shutter base plate with respect to a control mechanism of a shutter blade including the opening and closing drive mechanism and an unlocking mechanism and arranged at the front surface side (near side) of the shutter base plate. FIG. 2 is a plan view showing a single part of an intermediate plate. FIG. 3 is an enlarged plan view showing only approximately a left half in FIG. 1. Moreover FIG. 4 shows components of the unlocking mechanism arranged in a place apart from the shutter base plate more than the opening and closing drive mechanism so as to overlap the opening and closing drive mechanism shown in FIG. 3. Therefore, a portion of the configuration shown in FIG. 3 is also shown in FIG. 4.

In FIG. 1, the shutter base plate 1 forms an opening portion 1a at a substantially central portion thereof. An intermediate plate 2 and an auxiliary base plate 3 are attached to the rear surface side of the shutter base plate 1 in order with a predetermined interval therebetween, a blade chamber of the first blade to be described below is formed between the shutter base plate 1 and the intermediate plate 2, and a blade chamber of a second blade to be described below is formed between the intermediate plate 2 and the auxiliary base plate 3. An opening portion 2a having a peculiar shape is also formed in the place of the intermediate plate 2 which overlaps the opening portion 1a, and an oblong opening portion 3a, which is slightly larger than the opening portion 1a, is also formed in the place of the auxiliary base plate 3 which overlap with the opening 1a. Usually, an exposure opening (an opening which allows subject light to pass therethrough as a shutter) having a laterally long oblong shape is formed by one of the openings 1a, 2a, and 3a, or is formed by the synthesis of two or more of the openings. However, in the case of the first embodiment, the exposure opening may be formed only by the opening portion 1a.

The intermediate plate 2 of the first embodiment shown in FIGS. 1 and 2 is attached to the shutter base plate 1 by attachment holes (with no reference numerals) formed in three places including an upper right corner, a lower left corner, and a lower right corner. The shape of a contour forming edge which becomes the left of the opening portion 2a is formed in a complicated shape so as to avoid (evade) the operation loci of two driving pins to be described below as is well known. As for the intermediate plate 2, the shape of a contour forming edge 2b which becomes an upper portion of the opening portion 2a is formed in the shape of an arc which is convex toward the opening portion 2a side, that is, toward the opening portion 1a side which becomes the exposure opening in the first embodiment. The reason will be described in the description of the operation to be described below. The contour of the auxiliary base plate 3 is almost the same as the shutter base plate 1, but is formed smaller than the shutter base plate, and is attached to the shutter base plate 1 at one place of the upper left corner (not shown) besides at the same three places as in the case of the intermediate plate 2. Illustration of the contour of the auxiliary base plate 3 shown in FIG. 1 is omitted in FIG. 3.

As shown in FIGS. 1 and 3, two arc-like long holes 1b and 1c are formed in a left region of the opening portion 1a in the shutter base plate 1, and shock-absorbing members 4 and 5 made of rubber which are substantially C-shaped in plan view are attached to lower ends of these long holes as is well known. Three columns 1d, 1e, and 1f are erected from the left region of the opening portion 1a in the shutter base plate 1.

The column 1f among these columns attaches an upper base plate 7 shown in FIG. 4 by tightening a screw 6 shown in FIG. 4 in a screw hole (not shown) which is formed at the tip of the column. The columns 1d and 1e attach a cover plate 8 (whose contour is shown by a two-dotted chain line) at a predetermined interval from the upper base plate 7 by tightening screws (not shown) in screw holes (not shown) at the tips of the columns along with the column 7a and a shaft 7b which are erected from the upper base plate 7 as shown in FIG. 4, in addition to attaching the upper base plate 7 midway in the length direction.

Next, before describing components arranged between the shutter base plate 1 and the upper base plate 7 mainly with reference to FIG. 3, a shaft member erected from the shutter base plate 1 in order to attach the members will be described. Six shafts 1g, 1h, 1i, 1j, 1k and 1m are erected toward the upper base plate 7 from the shutter base plate 1. The shafts 1g and 1h among these shafts have shaft portions that pass through the shutter base plate 1 and are also erected from the rear surface side thereof, and rotatably attach two arms of the first blade and two arms of the second blade which will be described below, along with the shafts 1n and 1p erected from the rear surface side of the shutter base plate 1, respectively. The shafts 1k and 1m also function to fit smaller-diameter portions formed at the tips of the shafts into holes formed in the upper base plate 7, and also support the upper base plate 7 with a ring-shaped stepped end surface formed between the smaller-diameter portions.

Thus, first, the ring-shaped shock-absorbing member 9 is attached to the column 1d of the shutter base plate 1. A driving member 10 for a first blade is rotatably attached to the shaft portion of the shaft 1g erected from the upper base plate 7 side, and is urged by a driving spring for a first blade (not shown) so as to rotate in a clockwise direction. The driving member 10 for the first blade includes a locked portion 10a, a roller 10b rotatably attached to the surface thereof on the upper base plate 7 side, and the driving pin 10c on the shutter base plate 1 side. The driving pin 10c is passed through the long hole 1b of the shutter base plate 1, includes a proximal portion adapted to be able to abut on the shock-absorbing member 4, and includes a distal portion linked to the first blade in the blade chamber. The configuration of the first blade will be described below.

A first driving member 11 for a second blade and a second driving member 12 for a second blade are rotatably attached to the shaft portion of the shaft 1h of the shutter base plate 1 which is erected from the upper base plate 7 side such that the first driving member 11 for a second blade is located on the shutter base plate 1 side. The first driving member 11 for a second blade includes a columnar engaging portion 11a on the upper base plate 7 side, and includes a driving pin 11b on the shutter base plate 1 side. The driving pin 11b is passed through the long hole 1c of the shutter base plate 1. The driving pin 11b includes a proximal portion adapted to be able to abut on the shock-absorbing member 5, and a distal portion linked to the second blade in the blade chamber. The configuration of the second blade will be described below.

The second driving member 12 for a second blade includes a locked portion 12a and a window portion 12b which allows the engaging portion 11a to be inserted thereinto, and includes a roller 12c rotatably attached to the upper base plate 7 side. The second driving member 12 for a second blade is urged by a driving spring for a second blade (not shown) so as to rotate in the clockwise direction.

In the case of the first embodiment, a setting spring (not shown) is hung between the second driving member 12 for a second blade and the first driving member 11 for a second blade so as to perform urging such that the second driving member 12 is rotated in the clockwise direction and the first driving member 11 is rotated in the counterclockwise direction. However, in the state of FIGS. 1 and 3, the engaging portion 11a of the first driving member 11 comes into contact with the edge of the window portion 12b of the second driving member 12. Thus, the urging force is not exerted. As is well known, the setting spring is formed by two springs, one spring may impel the second driving member 12 so as to rotate the second driving member in the clockwise direction, and the other spring may impel the first driving member 11 so as to rotate the first driving member in the counterclockwise direction.

A setting member 13 is rotatably attached to the shaft 1i of the shutter base plate 1, and is urged by a spring (not shown) so as to rotate in the counterclockwise direction with the spring (not shown). A roller 13a which can come into contact with the roller 10b of the above-described driving member 10 for a first blade, and a roller 13b which can come into contact with the roller 12c of the above-described second driving member 12 for a second blade are rotatably attached to the surface of the setting member 13 on the shutter base plate 1 side.

A setting manipulating member 14 is rotatably attached to the shaft 1j of the shutter base plate 1. This setting manipulating member 14 includes a roller 14a manipulated by a member on the side of a camera body, and includes a shaft 14b erected from the surface thereof on the shutter base plate 1 side. The setting manipulating member 14 is linked to the setting member 13 via a link member 15. That is, a hole is formed at one end of the link member 15, and the shaft 14b of the setting manipulating member 14 rotatably fits into the hole. A pin 15 is provided on the upper base plate 7 side at the other end of the link member 14, and a shaft is erected from the shutter blade 1 side so as to become coaxial with a pin 15a of the link member. The shaft rotatably fits into a hole formed in the setting member 13.

Therefore, in FIG. 1, the setting manipulating member 14 is rotated in the counterclockwise direction via the link member 15 along with the rotation of the setting member 13 in the counterclockwise direction by the urging force of a spring (not shown), and is brought into the state of having stopped the shock-absorbing member 9 as a stopper. The setting manipulating member 14 is provided to rotate the setting member 13 in the clockwise direction via the link member 15 when the roller 14a is pushed and rotated in the clockwise direction by the member on the side of a camera body during a setting operation. However, the setting member 13 may be rotated in the clockwise direction directly by the member on the side of a camera body directly during a setting operation, without including such a setting manipulating member 14. However, since the link member 15 also becomes unnecessary in that case, as can be understood from the following description, it is necessary to provide a pin replacing the above pin 15a in the setting member 13.

A locking member 16 for a first blade is rotatably attached to the shaft 1k of the shutter base plate 1, and is urged by a spring (not shown) so as to rotate in the counterclockwise direction. Although the locking member 16 includes a locking portion 16a which is bent to the shutter base plate 1 side, the locking portion 16a locks the locked portion 10a of the driving member 10 for a first blade to prevent the rotation of the driving member 10 in the clockwise direction. The locking member 16 includes a pushed portion 16b made to further protrude to the upper base plate 7 side, at an upper end of the bent portion which is bent to the upper base plate 7 side. The tip of the pushed portion 16b is present between the upper base plate 7 and the cover plate 8 by inserting the pushed portion 16b into a substantially oblong hole 7c (refer to FIG. 4) of the upper base plate 7.

A locking member 17 for a second blade is rotatably attached to the shaft 1m of the shutter base plate 1, and is urged by a spring (not shown) so as to rotate in the clockwise direction. The lock member 17 includes a locking portion 17a which is bent to the shutter base plate 1 side, and a pushed portion 17b which is bent to the upper base plate 7 side. The locking portion 17a of these portions is provided to lock the locked portion 12a of the second driving member 12 for a second blade to prevent the rotation of the driving member 12 for a second blade in the clockwise direction. The tip of the pushed portion 17b, as shown in FIG. 4, is made to be present between the upper base plate 7 and the cover plate 8 on the lateral side of the upper base plate 7 and the cover plate 8.

As shown in FIG. 4, although the shaft 7d is erected toward the cover plate 8 side from the upper base plate 7, the shaft 7e is erected toward the shutter base plate 1 side concentrically with the shaft 7d, and the auxiliary setting member 18 is rotatably attached to the axis 7e. A spring is not hung on the auxiliary setting member 18. The auxiliary setting member 18 includes a pushing portion 18a, an arc-like long hole 18b, and a large relief hole 18c, and the pin 15a of the above-described link member 15 is inserted into the long hole 18b.

Figure 8:
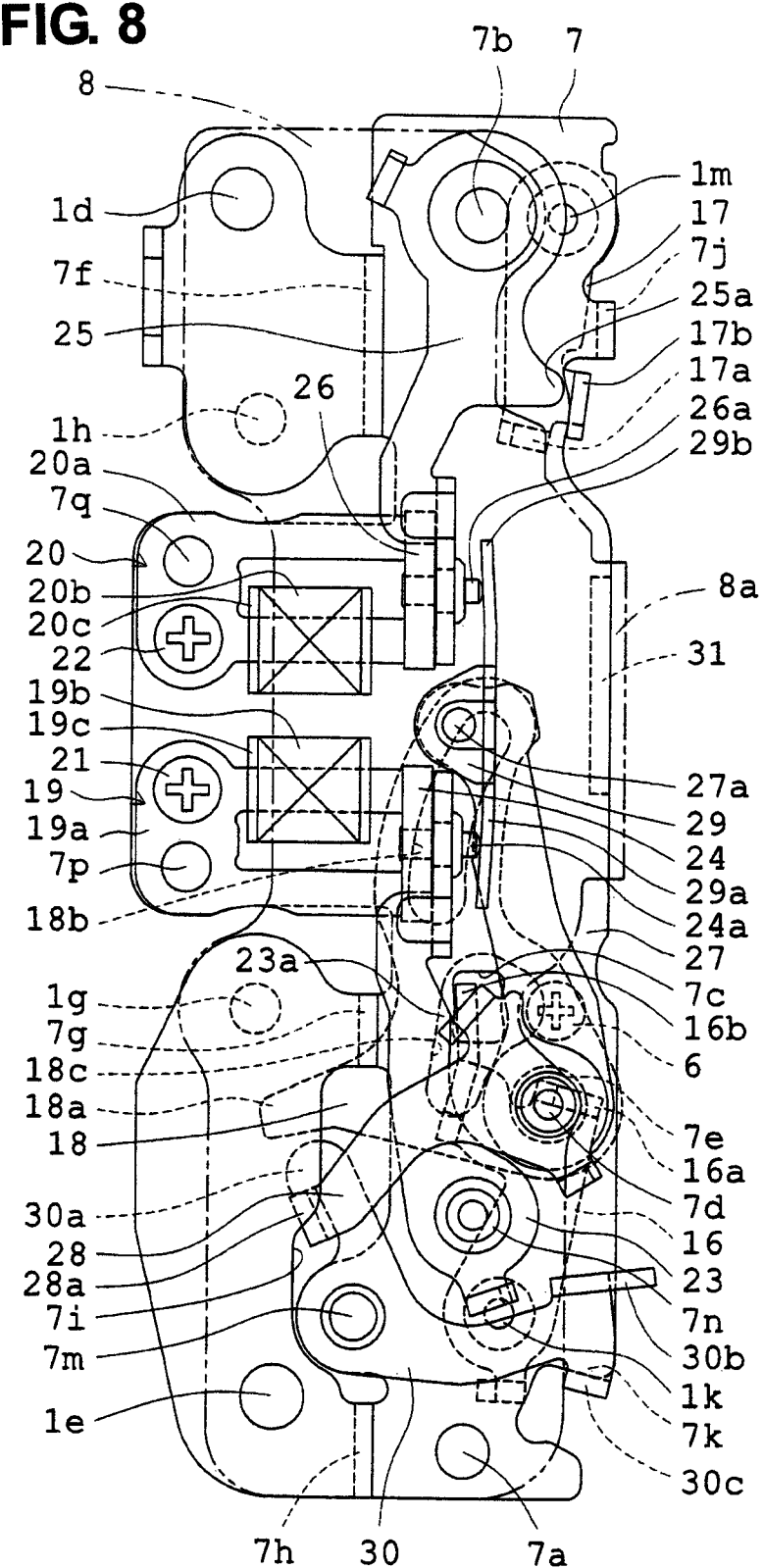
FIG. 8 is a plan view showing the setting completion state of the unlocking mechanism shown in FIG. 4.

Therefore, the auxiliary setting member 18 rotates in the counterclockwise direction if the setting member 13 rotates in the clockwise direction, and then rotates in the clockwise direction if the setting member 13 rotates in the counterclockwise direction. The relief hole 18c has a shape which allows the pushed portion 16b of the locking member 16 for a first blade to pass therethrough and be inserted into the hole 7c of the upper base plate 7 and which does not interfere with the pushed portion 16b during operation. Although the pin 15a of the link member 15 is shown in FIG. 4, the illustration thereof is omitted in FIGS. 8 to 10 referred to in the description of operation.

Next, although components arranged between the shutter base plate 7 and the cover plate 8 will be described mainly with reference to FIG. 4, the overall shape of the upper base plate 7, and a shaft member or the like erected toward the cover plate 8 from the upper ground 7 in order to attach the components will be described prior to this description. First, although the upper base plate 7 has a shape which is long in the up-and-down direction as a whole as is shown by a solid line in FIG. 4, a right half is formed as same plane region, whereas a left half is formed to as three overhang regions which overhang to the left from the right-half region.

The second overhang region from above is formed so as to become flush with the right-half region, whereas the two remaining overhang regions are stepped by the bent portions 7f, 7g, and 7h, and are formed so as to become high toward the cover plate 8 side. An elongate window portion 7i which has a special shape is formed between the two bent portions 7g and 7h. Moreover, although a bent portion 7j is formed at an upper right portion of such a upper base plate 7, and an abutted portion 7k is formed at a lower right portion, the bent portion 7j is bent to the shutter base plate 1 side so as to function as a stopper when the locking member 17 for a second blade is rotated in the counterclockwise direction.

Two shafts 7m and 7n are erected toward the cover plate 8 from the upper base plate 7 having such a shape, in addition to the shafts 7b and 7d which are already described. The shafts 7d and 7n among these shafts fit smaller-diameter portions formed at the tips thereof into holes formed in the cover plate 8, and support the cover plate with a ring-shaped stepped end surface formed between the smaller-diameter portions. Two locating pins 7p and 7q are erected toward the cover plate 8 side by the second overhang region of the upper base plate 7 from above.

Next, components attached to such an upper base plate 7 will be described. First, an electromagnet 19 for a first blade and an electromagnet 20 for a second blade fit holes formed in iron core members 19a and 20a to the locating pins 7p and 7q, and are then attached to the upper base plate 7 with screws 21 and 22. The electromagnets 19 and 20 include the iron core members 19a and 20a which have a U-shape and have tips of two respective legs as magnetic pole portions, and bobbins 19c and 20c which have coils 19b and 20b wound therearound, and are fitted on one leg of each of the iron core members 19a and 20a. Therefore, the legs of the iron core members 19a and 20a are floated without touching the surface of the upper base plate 7.

An unlocking member 23 for a first blade is rotatably attached to the shaft 7n of the upper base plate 7, and is urged by a release spring for a first blade (not shown) so as to rotate in the clockwise direction. The unlocking member 23 for a first blade includes a pushing portion 23a which pushes the pushed portion 16b of the lock member 16 for a first blade, and an iron piece member 24 is attached to a bent portion formed at the upper tip of the unlocking member as is well known. A pushed portion 24a is provided at the iron piece member 24 so as to protrude to the right of the bent portion thereof.

An unlocking member 25 for a second blade is rotatably attached to the shaft 7b of the upper base plate 7, and is urged by a release spring for a second blade (not shown) so as to rotate in the counterclockwise direction. The unlocking member 25 for a second blade includes a pushing portion 25a which pushes the pushed portion 17b of the lock member 17 for a second blade, and an iron piece member 26 is attached to a bent portion formed at the lower tip of the unlocking member. A pushed portion 26a is provided at the iron piece member 26 so as to protrude to the right of the bent portion thereof.

A hold member 27 and a hold auxiliary member 28 are separately attached rotatably to the shaft 7d of the upper base plate 7, the hold member 27 is arranged closer to the upper base plate 7 side than the unlocking member 23 for a first blade, and the hold auxiliary member 28 is arranged closer to the cover plate 8 side than the unlocking member 23 for a first blade. The hold member 27 is urged by a first spring (not shown) so as to rotate in the clockwise direction.

A second spring (not shown) which urges the hold member 27 so as to rotate the hold member in the counterclockwise direction and urges the hold auxiliary member 28 so as to rotate the hold auxiliary member in the clockwise direction is hung between the hold member 27 and the hold auxiliary member 28. In FIG. 4, the relative relationship between the hold member 27 and the hold auxiliary member 28 is brought into a limit state which can be rotated in mutually different directions by the urging force of the second spring, and both the hold member and the hold auxiliary member are rotated together in the clockwise direction and stopped by the urging force of the first spring.

Therefore, if the hold auxiliary member 28 is rotated in the counterclockwise direction in the state of FIG. 4, the hold member 27 is also rotated together in the counterclockwise direction together against the urging force of the first spring. Thereafter, if the force which rotates the hold auxiliary member 28 in the counterclockwise direction is lost, both the hold member and the hold auxiliary member are rotated together by the urging force of the first spring in the clockwise direction. However, only in a case where the hold member 27 and the hold auxiliary member 28 are rotated together in the counterclockwise direction together and the rotation of the hold member 27 is prevented, only the hold auxiliary member 28 can slightly continue its rotation in the counterclockwise direction while tensioning the second spring. Such a configuration between both the hold member and the hold auxiliary member is well known, and one example of a specific configuration is described in, for example, JP-A-2007-34042.

A shaft 27a is erected from the tip of the hold member 27, and a well-known pressing member 29 is attached to the shaft 27a. The pressing member 29 includes two pressing portions 29a and 29b which are formed so as to stretch in the up-and-down direction of FIG. 3, and these pressing portions can push pushed portions 24a and 26a of the iron piece members 24 and 26, and can push the iron piece members 24 and 26 to the iron core members 19a and 20a. Since the pressing member 29 can reliably press the two iron piece members 24 and 26 to the iron core members 19a and 20a, this pressing member is adapted to be able to rotate at a predetermined angle with respect to the shaft 27a through a well-known configuration. On the other hand, the hold auxiliary member 28 includes a tip arranged on the rear surface side of the upper base plate 7 through the window portion 7i, and the pressed portion 28a bent to the shutter base plate 1 side is adapted to push the pushing portion 18a of the auxiliary setting member 18.

A release member 30 is rotatably attached to the shaft 7m of the shutter base plate 7, and is urged by a spring (not shown) so as to rotate in the counterclockwise direction. The release member 30 includes a locking portion 30a at the tip of one arm portion, includes a pushed portion 30b and an abutting portion 30c at the tip of the other arm portion, and is arranged closer to the upper base plate 7 side than the hold auxiliary member 28. The locking portion 30a passes through the window portion 7i so as to be able to lock the pushed portion 28a of the hold auxiliary member 28 on the rear surface side of the upper base plate 7, and prevent the rotation of the hold auxiliary member 28 in the clockwise direction. The pushed portion 30b is a portion which is pushed by the member (not shown) on the side of a camera body, and the abutting portion 30c is a portion which abuts on the abutted portion 7k formed at the upper base plate 7 and is stopped, when the release member 30 is rotated in the counterclockwise direction by the urging force of a spring (not shown).

Another member is arranged between the upper base plate 7 and the cover plate 8. That is, in the cover plate 8, a bent portion 8a is formed in an elongated fashion in the up-and-down direction toward the upper base plate 7 side at a central right end of FIG. 4, and a shock-absorbing member 31 (shown by a broken line for convenience) made of rubber which has an elongate rectangular parallelepiped is attached to the left of the bent portion 8a with an adhesive. Although FIG. 4 shows that the shock-absorbing member 31 partially overlaps the hold member 27, in practice, the shock-absorbing member is attached to the bent portion 8a in a place near the cover plate 8 side. Thus, the shock-absorbing members does not affect the operation of the hold member 27, and is arranged so that only the pressing portions 29a and 29b of the pressing member 29 attached to the hold member 27 can abut thereon.

Next, components arranged on the rear surface side of the shutter base plate 1 in addition to the intermediate plate 2 and the auxiliary base plate 3 which have already been described will be described with reference to FIGS. 1 and 2. First, the first blade arranged between the shutter base plate 1 and the intermediate plate 2 includes two arms 32 and 33 one end of each of which is pivotally attached to each of two shafts 1g and 1n erected from the shutter base plate 1, and four blades 34, 35, 36, and 37 which are pivotally supported in order toward free ends of the arms, and the blade 37 pivotally supported on the foremost end among the blades is used as a slit forming blade. The arm 32 fits a driving pin 10c of the driving member 10 for a first blade into a well-known hole, and forms two light-shielding portions 32a and 32b near a pivotally attached portion onto the shaft 1g. The overlap relationship between the arms 32 and 33 and the blades 34, 35, 36, and 37 is such that the arms 32 and 33 are present closest to the shutter base plate 1 side, and the blade 34 is present closest to the intermediate plate 2 side.

The second blade arranged between the intermediate plate 2 and the auxiliary base plate 3 includes two arms 38 and 39 one end of each of which is pivotally attached to each of two shafts 1h and 1p erected from the shutter base plate 1, and four blades 40, 41, 42, and 43 which are pivotally supported in order toward free ends of the arms, and the blade 43 pivotally supported on the foremost end among the blades is used as a slit forming blade. The arm 38 fits a driving pin 11b of the first driving member 11 for a second blade into a well-known hole, and forms two light-shielding portions 38a and 38b near a pivotally attached portion onto the shaft 1h. The overlap relationship between the arms 38 and 39 and the blades 40, 41, 42, and 43 is such that the arms 38 and 39 are present closest to auxiliary base plate 3 side, and the blade 40 is present closest to the intermediate plate 2 side.

Finally, two photoelectric sensors 44 and 45 which have the same configuration are attached to the vicinities of the shafts 1g and 1h on the rear surface side of the shutter base plate 1. The photoelectric sensors 44 and 45 are jointly called a photo-interrupter, are configured such that a light-emitting portion and a light-receiving portion are arranged to face each other, and the light emitted from the light-emitting portion is received by the light-receiving portion, and are adapted to output a H (High) signal when the light-receiving portion receives light, and output an L (Low) signal when the light receiving portion does not receive light. In the case of the first embodiment, the light-shielding portions 32a and 32b of the arm 32 are adapted to be able to cut off an optical path of the photoelectric sensor 44, and the light-shielding portions 38a and 38b of the arm 38 are adapted to be able to cut off an optical path of the photoelectric sensor 45.

Next, the operation of the first embodiment will be described. FIGS. 1, 3 and 4 show a state immediately after the end of an exposure operation, that is, a state immediately after the end of photographing, as already described. At this time, the setting member 13 shown in FIGS. 1 and 3 is urged by the urging force of a spring (not shown) so as to rotate in the counterclockwise direction. However, as the setting manipulating member 14 interlocked with the setting member 13 comes into contact with shock-absorbing member 9, this stop state is maintained. Hereinafter, as for the setting member 13, this stop position is referred to as an initial position.

At this time, the driving member 10 for a first blade and the first driving member 11 for a second blade cause the driving pins 10c and 11b thereof to abut on the shock-absorbing members 4 and 5, and the rotation thereof in the clockwise direction is stopped. Thereby, the four blades 34 to 37 of the first blade are brought into the overlap state where the mutual overlap amount thereof is maximized, and are stored in a lower region of the opening portion 1a, and the four blades 40 to 43 of the second blade are brought into a development state where the mutual overlap amount thereof is minimized, so as to close the opening portion 1a. At this time, the hold member 27 and the hold auxiliary member 28 are urged by a first spring (not shown) so as to rotate in the clockwise direction. However, as shown in FIG. 4, the rotation of the pushed portion 28a of the hold auxiliary member 28 is prevented by coming into contact with the pushing portion 18a of the auxiliary setting member 18.

At this time, the unlocking member 23 for a first blade is rotated in the clockwise direction by the urging force of a release spring (not shown) for a first blade, causes the iron piece member 24 to separate from the iron core member 19a of the electromagnet 19 for a first blade, and is stopped in a state where the pushing portion 23a pushes the pushed portion 16b of the locking member 16 for a first blade against the edge of the hole 7c of the upper base plate 7. At this time, the unlocking member 25 for a second blade is rotated in the counterclockwise direction by the urging force of the release spring (not shown) for a second blade, causes the iron piece member 26 to separate from the iron core member 20a of the electromagnet 20 for a second blade, and is stopped in a state where the pushing portion 25a pushes the pushed portion 17b of the locking member 17 for a second blade and pushes the locking member 17 for a second blade against the bent portion 7j of the upper base plate 7. In this state, an electric current is not applied to the coils 19c and 20c of the two electromagnets 19 and 20.

If the exposure operation of the first blade and the second blade is completed and is brought into such a state, a setting operation is performed immediately after imaging information is transmitted via an image processing circuit from an imaging element and is stored in a storage device. In the case of the first embodiment, in FIG. 3, the setting operation is started as the setting manipulating member 14 includes the roller 14a pushed and rotated in the clockwise direction by the member (not shown) on the side of a camera body. Thus, the setting operation will be described with reference to FIGS. 5 to 8 other than FIGS. 3 and 4.

As described above, in FIG. 3, if the member (not shown) on the side of a camera body pushes the roller 14a to rotate the setting manipulating member 14 in the clockwise direction, the setting member 13 is rotated in the clockwise direction against the urging force of the spring (not shown). Therefore, on the one hand, the two rollers 13a and 13b of the setting member 13 set the opening and closing drive mechanism; on the other hand the pin 15a of the link member 15 rotates the auxiliary setting member 18 in the counterclockwise direction in FIG. 4, to set the unlocking mechanism. Although those setting operations are performed in parallel, first of all, the setting operation of the opening and closing drive mechanism will be described first.

Thus, first, in FIG. 3, if the setting member 13 starts to rotate in the clockwise direction, the roller 13a first pushes the roller 10b of the driving member 10 for a first blade, and rotates the driving member 10 in the counterclockwise direction against the urging force of the driving spring (not shown) for a first blade. Thus, the four blades 34 to 37 of the first blade stored at a lower position of the opening portion 1a is operated upwards with the slit forming blade 37 in the lead while the overlap amount between adjacent blades is made small. If the overlap between the slit forming blade 37 of the first blade and the slit forming blade 43 of the second blade reaches a predetermined amount, since the other roller 13b of the setting member 13 begins to push the roller 12c of the second driving member 12 for a second blade. Therefore, the second driving member 12 is rotated in the counterclockwise direction against the urging force of the driving spring (not shown) for a second blade.

As described above, a setting spring (not shown) is hung between the first driving member 11 for a second blade and the second driving member 12 for a second blade so as to perform urging such that the first driving member 11 is rotated in the counterclockwise direction and the second driving member 12 is rotated in the clockwise direction. Thus, if the second driving member 12 is rotated in the counterclockwise direction by the setting member 13 as described above, the first driving member 11 is rotated in the counterclockwise direction such that the engaging portion 11a thereof follows the edge of the window portion 12b of the second driving member 12. Therefore, the four blades 40 to 43 of the second blade are operated upwards while the overlap amount between adjacent blades from that point is made small. Thereafter, the first blade and the second blade continue an operation while the overlap amount between slit forming blades is favorably maintained.

If the setting operation is performed in this way, the four blades 34 to 37 of the first blade are brought into a development state so as to cover the opening portion 1a, the four blades 40 to 43 of the second blade are brought into an overlap state so as to become the stage of being stored at the upper position of the opening portion 1a, the driving pin 11b of the first driving member 11 for a second blade abuts on the upper end of the arc-like long hole 1c formed in the shutter base plate 1, and is stopped.

Then, since the driving member 10 for a first blade, and the second driving member 12 for a second blade also continue rotating slightly in the counterclockwise direction from that time on, the four blades 34 to 37 of the first blade also continue upward operation. However, since the four blades 40 to 43 of the second blade remain stopped, a setting spring (not shown) hung between the first driving member 11 for a second blade and the second driving member 12 for a second blade is tensioned. That is, in the case of the first embodiment, even if the second driving member 12 rotates further by allowing such an operation, the four blades 40 to 43 of the second blade are not operated upwards any more along with this.

Therefore, since the space of the storage region of the second blade, that is, the distance from the upper end edge of the opening portion 1a to the upper end edge of the shutter base plate 1 becomes short, components (not shown) on the side of a camera body, such as an optical finder, can be installed as advantageously as possible. Accordingly, in a case where it is not necessary to provide such a configuration, the first driving member 11 for a second blade and the second driving member 12 for a second blade may be configured as one member as in the focal plane shutter described above in JP-A-2008-164805.

In the case of the first embodiment, even after the rotation of the first driving member 11 for a second blade has stopped in this way, the driving member 10 for a first blade and second driving member 12 for a second blade are still rotated in the counterclockwise direction. Thereby, the driving member 10 begins to rotate the locking member 16 for a first blade slightly in the clockwise direction against the urging force of the spring (not shown) as the locked portion 10a pushes the locking portion 16a which has already been present within the operation locus of the locked portion 10a in that stage (the reason can be understood from the description of the setting operation of the unlocking mechanism to be described below). Then, if the driving member 10 for a first blade rotates still and the contact is released, the locking member 16 for a first blade is rotated in the counterclockwise direction by the urging force of the spring (not shown), bringing a state where the locking portion 16a can be locked to the locked portion 10a.

On the other hand, in the stage where the locked portion 10a of the driving member 10 for a first blade pushes the locking portion 16a of the locking member 16 for a first blade as described above, the second driving member 12 for a second blade also begins to rotate the locking member 17 for a second blade in the counterclockwise direction against the urging force of the spring (not shown) such that the locked portion 12a pushes the locking portion 17a which has already been present within the operation locus of the locked portion 12a (the reason can be understood from the description of the setting operation of the unlocking mechanism to be described below). Then, if the second driving member 12 for a second blade rotates still and the contact is released, the locking member 17 for a second blade is rotated in the clockwise direction by the urging force of the spring (not shown), bringing a state where the locking portion 17a can be locked to the locked portion 12a. The state at that time is an oversetting state shown in FIG. 4.

If such an oversetting state is brought about, the member (not shown) on the side of a camera body separates from the roller 14a of the setting manipulating member 14. Therefore, the setting member 13 is able to rotate in the counterclockwise direction due to the urging force of the spring (not shown) and returns to its initial position while rotating the setting manipulating member 14 in the counterclockwise direction via the link member 15.

On the other hand, since the rollers 13a and 13b of the setting member 13 release the pressing force to the rollers 10b and 12c of the two driving members 10 and 12 through this rotation, the driving members 10 and 12 are rotated in the clockwise direction by the urging force of the driving spring for a second blade (not shown). However, the locked portions 10a and 12a are locked and stopped by the locking portions 16a and 17a of the respective locking member 16 and 17 in a place where both the driving members have slightly rotated. Although the four blades 34 to 37 of the first blade are operated slightly downward through this slight rotation, a portion of the opening portion 1a is not opened.

Figure 6:
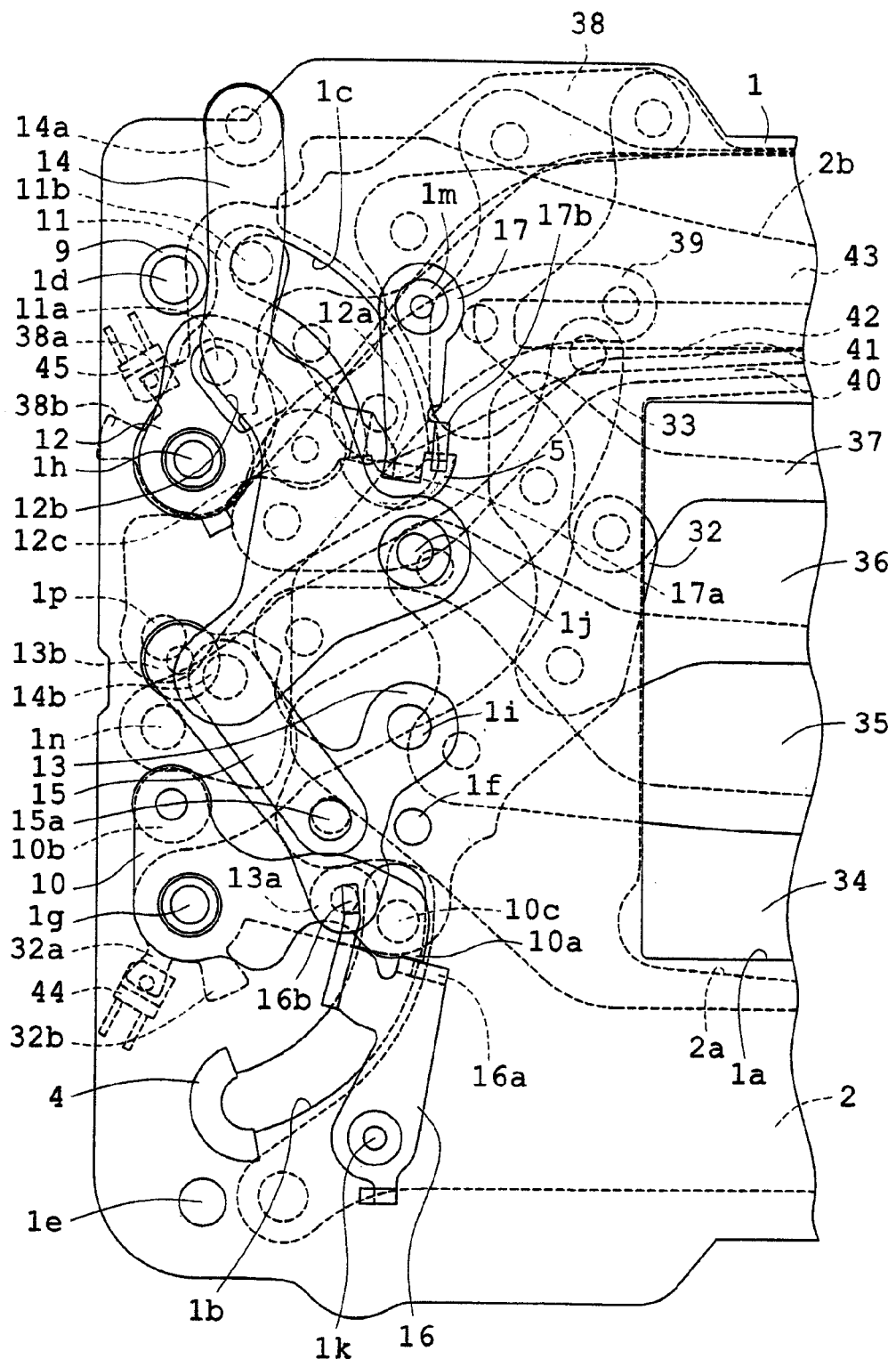
FIG. 6 is a plan view showing a setting completion state of the opening and closing drive mechanism shown in FIG. 3.
Figure 7:
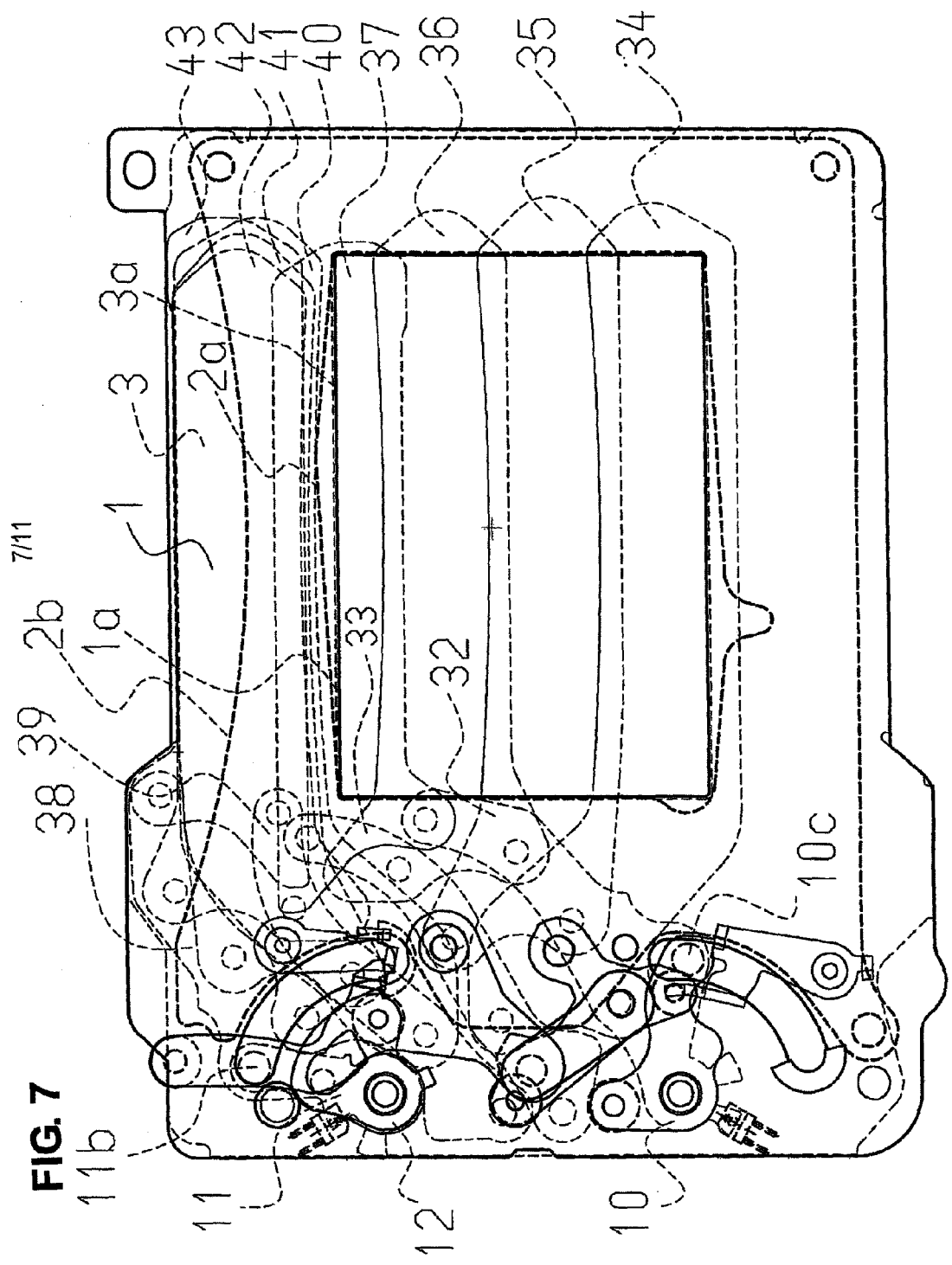
FIG. 7 is a plan view showing, in the same manner as FIG. 1, a setting completion state of the opening and closing drive mechanism.

Thereafter, the setting operation is completed if the setting member 13 stops at the initial position. FIGS. 6 and 7 is a plan view showing a setting completion state, that is, a photographing standby state. In the case of the first embodiment, as shown in FIG. 1, the contour forming edge 2b of the intermediate plate 2 is formed in the shape of an arc which becomes convex to the opening portion 1a side. Therefore, as shown in FIG. 7, in this photographing standby state, about one third of the blade 40 in the overlap state with the other three blades 41 to 43 does not come into contact with the intermediate plate 2 in a region located above the opening portion 1a. Since an electric current is applied to the photoelectric sensors 44 and 45 from when a power source of the camera is turned on, in this setting completion state, the optical paths of both the photoelectric sensors are cut off by the light-shielding portions 32a and 38a of the arms 32 and 38 to output an L signal.

The description of the setting operation of the opening and closing drive mechanism is finished above. Next, a case where the setting member 13 rotates in the clockwise direction against the urging force of the spring (not shown) in FIG. 3 during a setting operation, and the unlocking mechanism is set by the pin 15a of the link member 15. If the setting member 13 rotates in the clockwise direction in FIG. 3, the auxiliary setting member 18 shown in FIG. 4 is pushed by the pin 15a of the link member 15 at the edge thereof in the width direction of the long hole 18b and rotated in the counterclockwise direction, pushes the pressed portion 28a of the hold auxiliary member 28 by means of the pushing portion 18a, and rotates the hold member 27 and the hold auxiliary member 28 in the counterclockwise direction against the urging force of the first spring (not shown).

Thereby, the pressing member 29 attached to the tip of the hold member 27 pushes the pushed portions 24a and 26a of the iron piece members 24 and 26, and 26a by means of the two pressing portions 29a and 29b, and rotates the unlocking member 23 for a first blade in the counterclockwise direction and rotates the unlocking member 25 for a second blade in the clockwise direction, against the urging force of each spring (not shown). Along with the rotation, the pushing portions 23a and 25a of the two unlocking members 23 and 25 release the pressing force to the pushed portion 16b and 17b of the locking member 16 for a first blade and the locking member 17 for a second blade.

As a result, since the locking member 16 for a first blade rotates in the counterclockwise direction and the locking member 17 for a second blade rotates in the clockwise direction, by the urging force of each spring (not shown), as described in the description of the operation of the opening and closing drive mechanism, the locking portions 16a and 17a are present within the operation loci of the locked portions 10a and 12a formed in two driving members 10 and 12. The rotation of the locking members 16 and 17 is stopped as the pushed portions 16b and 17b abut on the edge of the upper base plate 7.

Even after that, if the hold member 27 rotates the unlocking member 23 for a first blade and the unlocking member 25 for a second blade by means of the pressing member 29, the iron piece members 24 and 26 eventually come into contact with the respective iron core members 19a and 20a of the electromagnet 19 for a first blade and the electromagnet 20 for a second blade. Therefore, the rotation of the unlocking member 23 for a first blade and the unlocking member 25 for a second blade stops, and the hold member 27 cannot rotate in the counterclockwise direction. However, since the pushed portion 28a of the hold auxiliary member 28 is pushed by the pushing portion 18a of the auxiliary setting member 18 even after that, the hold auxiliary member 28 stops in a place where the hold auxiliary member has been slightly rotated, while tensioning the second spring (not shown) hung between the hold auxiliary member and the hold member 27.

On the other hand, after the iron piece members 24 and 26 come into contact with the iron core members 19a and 20a as described above, the rotation of a release lever 30 which is prevented by the pushed portion 28a of the hold auxiliary member 28 until then is allowed. As a result, the release lever is rotated in the counterclockwise direction by the urging force of the spring (not shown), and the abutting portion 30c thereof abuts on the abutted portion 7k of the upper base plate 7, and is stopped. Thereby, the locking portion 30a of the release member 30 enters the operation locus of the pushed portion 28a of the hold auxiliary member 28, and is brought into a state where the rotation of the hold auxiliary member 28 in the clockwise direction can be prevented. When the rotation of the auxiliary setting member 18 stops and the unlocking mechanism is brought into such a state is when an oversetting state described in the setting operation of the opening and closing drive mechanism is brought about.

If the setting member 13 is returned to its initial position from such an oversetting state as described above, the auxiliary setting member 18 is also rotated in the clockwise direction. Thus, the hold auxiliary member 28 is also rotated in the clockwise direction by the urging force of the second spring (not shown) hung between the hold auxiliary member and the hold member 27. However, the pushed portion 28a of the hold auxiliary member 28 is locked to the locking portion 30a of the release member 30 and is stopped, in a place where the rotation thereof has been slightly rotated.

Since the rotation of the hold auxiliary member 28 at this time is within a range where the urging force of the second spring (not shown) hung between the hold auxiliary member and the hold members 27 acts, the hold member 27 does not rotate, and the pressing portions 29a and 29b of the pressing member 29 still bring the iron piece members 24 and 26 into contact with the iron core members 19a and 20a. Such a state is the setting completion state, that is, the photographing standby state, of the unlocking mechanism shown in FIG. 8.

Figure 9:
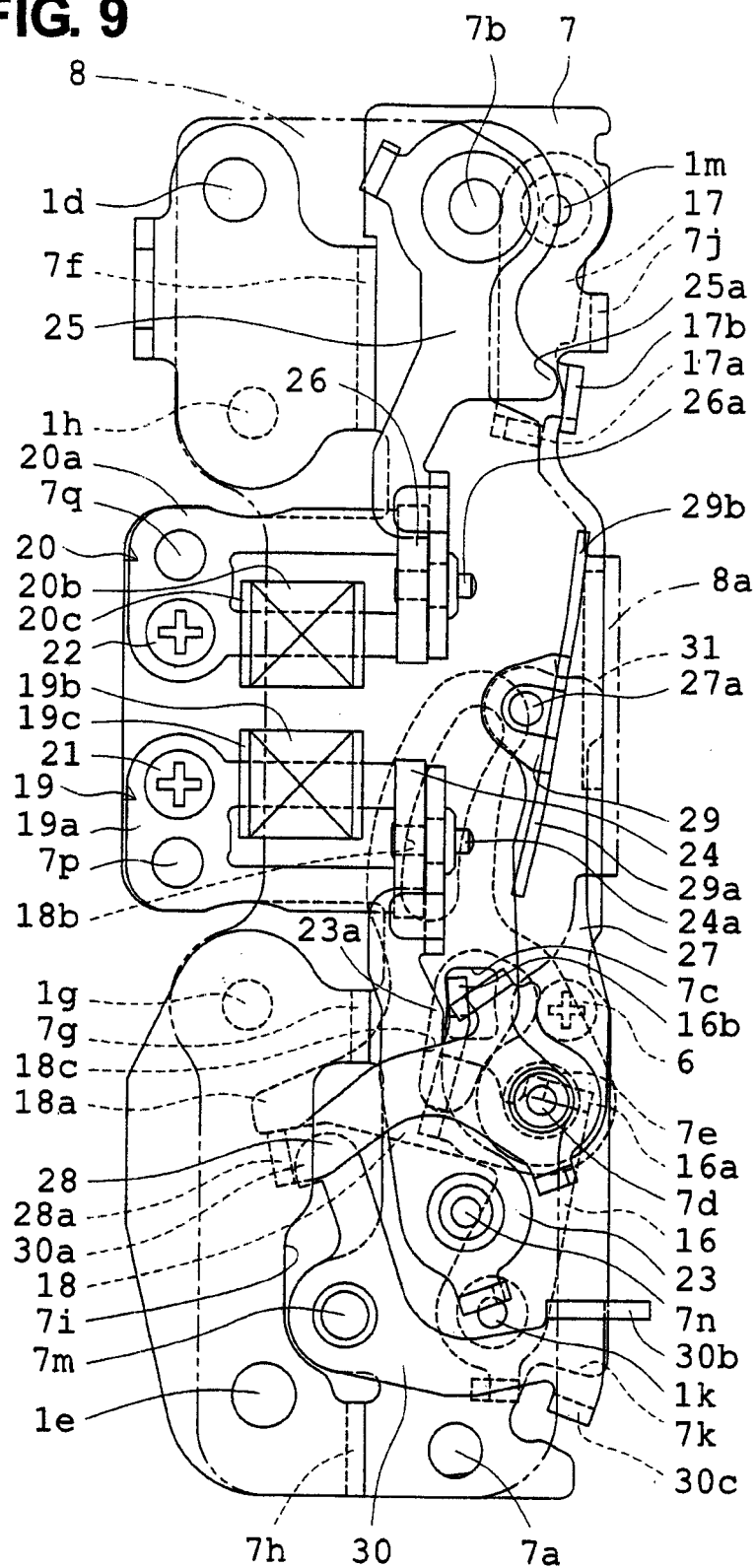
FIG. 9 is a plan view showing a phenomenon which is generated by the unlocking mechanism shown in FIG. 4 immediately after the release of a camera.
Figure 10:
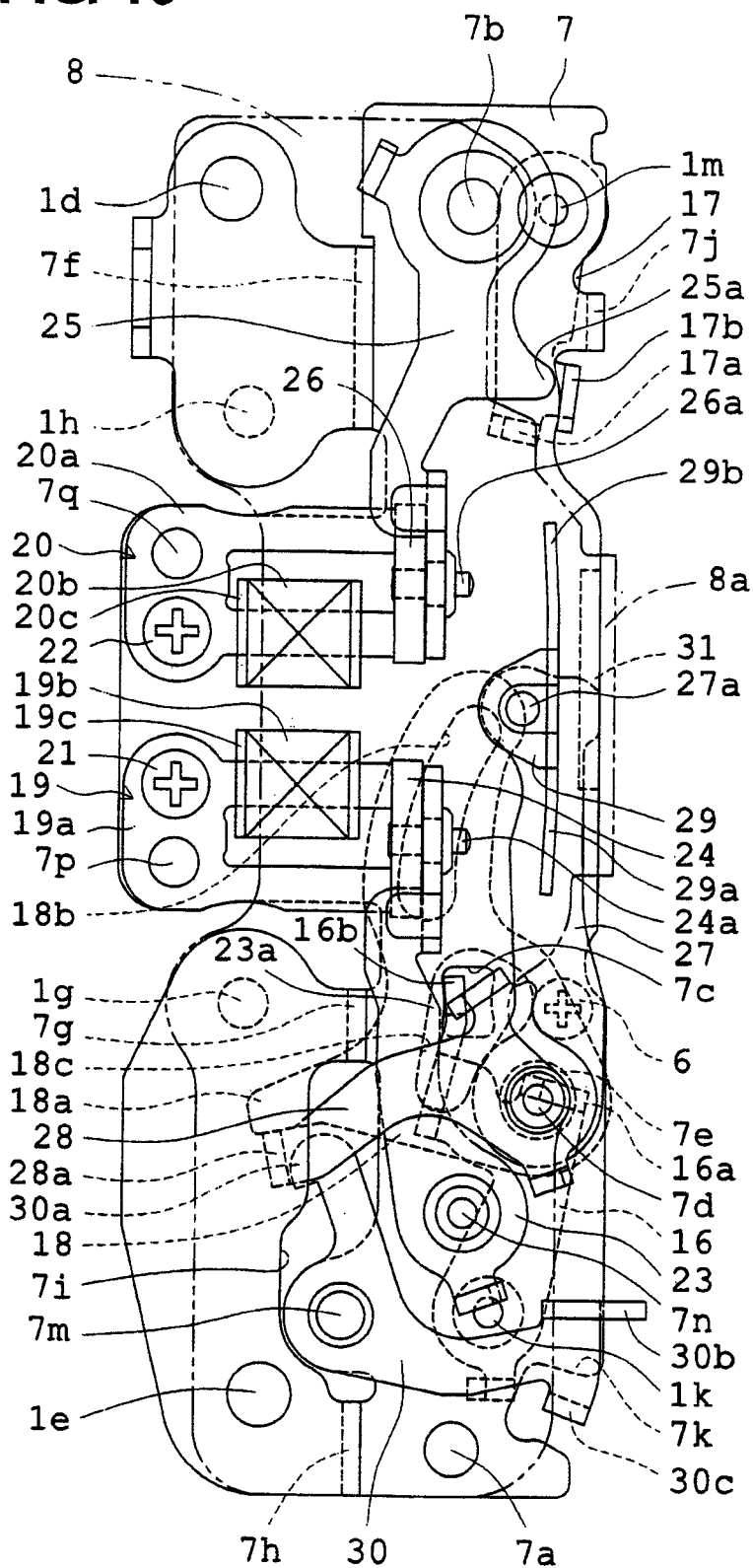
FIG. 10 is a plan view showing the state of the unlocking mechanism immediately after the state shown in FIG. 9.

Next, FIGS. 9 and 10 also illustrate the operation at the time of photographing. When a photographer pushes a release button of a camera in the photographing standby state shown in FIGS. 6 to 8 while observing a subject image with an optical finder, first, on the one hand, a movable mirror is flipped up to withdraw from a photographing optical path; on the other hand, an electric current is applied to the coil 19b of the electromagnet 19 for a first blade and the coil 20b of the electromagnet 20 for a second blade. Therefore, the iron piece members 24 and 26 which are merely brought into contact with the iron core members 19a and 20a until then are attracted to the iron core members 19a and 20a by electromagnetic forces. Thus, next, since the member (not shown) on the side of a camera body pushes the pushed portion 30b of the release member 30 in FIG. 8, the release member 30 rotates in the clockwise direction to release the lock of the hold auxiliary member 28 which has been performed by the locking portion 30a.

The hold auxiliary member 28 which has released the lock of the pushed portion 28a rotates in the clockwise direction along with the hold member 27 by the urging force of the first spring (not shown), after having rotated extremely slightly by the urging force of the second spring (not shown). If the hold member 27 starts to rotate in the clockwise direction in this way, the pressing portions 29a and 29b of the pressing member 29 separate from the pushed portions 24a and 26a of the iron piece members 24 and 26. However, as described above, since the iron core members 24 and 26 have already been attracted by the iron core members 19a and 20a, the unlocking member 23 for a first blade, and the unlocking member 25 for a second blade cannot be rotated by the urging force of each spring (not shown), and maintain the state of FIG. 10. The rotation of the hold member 27 and the hold auxiliary member 28 in the clockwise direction is stopped as the pushed portion 28a of the hold auxiliary member 28 abuts on the pushing portion 18a of the auxiliary setting member 18.

Although the rotation of the hold member 27 is stopped in this way, the pressing member 29 attached to the hold member 27 inclines greatly and vibrates about the shaft 27a. Meanwhile, in the case of the first embodiment, the shock-absorbing member 31 made of rubber is attached to the bent portion 8a of the cover plate 8. Thus, if the pressing member 29 inclines, either of the pushing portions 29a and 29b abuts on the shock-absorbing member 31, and the vibration of the pressing member 29 is settled at an early stage. FIG. 9 shows a state where the pressing portion 29b of the pressing member 29 abuts on the shock-absorbing member 31 through such inclination. A state where the pressing member 29 takes an ideal posture and becomes stationary after that is shown in FIG. 10.

If the state shown in FIG. 10 is obtained, next, an electric current applied to the coil 19b of the electromagnet 19 for a first blade is cut off. Therefore, since the attraction force to the iron piece member 24 is lost, the unlocking member 23 for a first blade is rotated in the clockwise direction by the urging force of the release spring for a first blade (not shown). In this process, the pushing portion 23a pushes the pushed portion 16b of the locking member 16 for a first blade. Therefore, the locking member 16 for a first blade is rotated in the clockwise direction against the urging force of the spring (not shown), and releases the lock of the driving member 10 for a first blade which has been locked by the locking portion 16a until then. Then, the rotation of the unlocking member 23 for a first blade after that stops as the pushing portion 23a presses the pushed portion 16b of the locking member 16 for a first blade against the edge of the hole 7c formed in the upper base plate 7.

If the unlocking member 23 for a first blade releases the lock of the locked portion 10a of the driving member 10 for a first blade using the locking portion 16a of the locking member 16 for a first blade, the driving member 10 for a first blade is quickly rotated in the clockwise direction by the urging force of the driving spring (not shown) for a first blade from the state of FIGS. 6 and 7. Therefore, the four blades 34 to 37 of the first blade operate downward of the opening portion 1a while increasing the overlap between adjacent blades, and opens the opening portion 1a by means of the upper end edge of the slit forming blade 37. Then, as is well known, in a case where a subject is dark or in a case where flash photographing is performed, the four blades 34 to 37 of a first blade fully open the opening portion 1a, and then the two driving members 11 and 12 for a second blade are rotated in the clockwise direction. However, in the description of the operation of the first embodiment, a case where a subject is bright and photographing is performed without using flash will be described.

If a predetermined time has lapsed after an electric current applied to the coil 19b of the electromagnet 19 for a first blade is cut off as described above, an electric current applied to the coil 20b of the electromagnet 20 for a second blade is cut off at this time. Therefore, since the attraction force to the iron piece member 26 is lost, the unlocking member 25 for a second blade is rotated in the counterclockwise direction by the urging force of the release spring for a second blade (not shown) form the state of FIG. 10. In this process, the pushing portion 25a pushes the pushed portion 17b of the locking member 17 for a second blade. Thereby, the locking member 17 for a second blade is rotated in the counterclockwise direction against the urging force of the spring (not shown), and releases the lock of the second driving member 12 for a second blade which has been locked by the locking portion 17a until then. Then, the rotation of the unlocking member 25 for a second blade after that stops as the pushing portion 25a presses the locking member 17 for a second blade against the bent portion 7j formed in the upper base plate 7.

If the lock caused by the locking member 17 for a second blade is released in this way, the second driving member 12 for a second blade is quickly rotated in the clockwise direction by the urging force of the driving spring for a second blade (not shown) from the state of FIGS. 6 and 7. However, in the initial stage, the edge of the window portion 12b pushes the engaging portion 11a of the first driving member 11 for a second blade. Thus, the first driving member 11 for a second blade also starts to rotate in the clockwise direction. Accordingly, the two driving members 11 and 12 rotate integrally in the clockwise direction since then. Then, if the first driving member 11 for a second blade starts to rotate in the clockwise direction, the four blades 40 to 43 of the second blade operate into the opening portion 1a while making small the overlap between adjacent blades, and the opening portion 1a is closed from above by the lower end edge of the slit forming blade 43. Therefore, the imaging surface of an imaging element is exposed downward from above by a slit formed between the slit forming blade 37 of the first blade and the slit forming blade 43 of the second blade.

Meanwhile, in the case of the first embodiment, the shape of the intermediate plate 2 is different from that in the related art. That is, as already described, the intermediate plate 2 of the first embodiment is formed such that the contour forming edge 2b on the side where the four blades 40 to 43 of the second blade are brought into an overlap state and stored becomes an arc shape which becomes convex toward the exposure opening, that is, the opening portion 1a side. Therefore, in the setting completion state shown in FIGS. 6 and 7, the width of overlap of the four blades 40 to 43 of the second blade with the intermediate plate 2 becomes the smallest substantially at the central portion in the length direction of the blades. Thus, the reason why the intermediate plate 2 of the first embodiment has such a shape will be described here.

As is well known, in the case where the first blade is arranged between the shutter base plate 1 and the intermediate plate 2 and the second blade is arranged between the intermediate plate 2 and the auxiliary base plate 3, as in the first embodiment, the largest air interval is required in a place where the four blades 34 to 37 of the first blade are brought into an overlap state between the shutter base plate 1 and the intermediate plate 2, and the largest air interval is required in a place where the four blades 40 to 43 of the second blade are brought into an overlap state between the intermediate plate 2 and the auxiliary base plate 3. That is, in the case of the first embodiment, the blade chamber between the shutter base plate 1 and the intermediate plate 2 requires the largest air interval under the opening 1a, and the blade chamber between the intermediate plate 2 and the auxiliary base plate 3 requires the largest air interval above the opening portion 1a.

Meanwhile, in recent years, the interval between the shutter base plate 1 and the auxiliary base plate 3 is required to be made as small as possible with camera miniaturization. Therefore, when the blades are brought into an overlap state, the four blades 34 to 37 of the first blade are comparatively strongly pinched by the shutter base plate 1 and the intermediate plate 2, and the four blades 40 to 43 of the second blade are comparatively strongly pinched by the intermediate plate 2 and the auxiliary base plate 3. Therefore, when the operation to the development state from the overlap state is performed even in the case of the four blades 34 to 37 of the first blade, and even in the case of the four blades 40 to 43 of the second blade, it is necessary to start the operation against a larger frictional resistance force than in the related art.

In such a situation, in the case of the first embodiment, when the four blades 34 to 37 of the first blade are operated to the development state from the overlap state is when the setting operation is performed. Therefore, even if the starting timing of the operation becomes somewhat unstable in the case of the first blade, a particularly big problem is not caused in photographing itself.

However, when the four blades 40 to 43 of the second blade are operated to the development state from the overlap state is when the exposure operation is performed. Therefore, if the mutual frictional resistance force between the blades 40 to 43, the frictional resistance force between the slit forming blade 40 to 43 and the auxiliary base plate 3, or the frictional resistance force between the blade 40 and the intermediate plate 2 is large, due to slight differences in part processing or assembly processing, the starting timing of the operation may become unstable, or the slit forming blade 43 may incline slightly and start an operation. Accordingly, particularly in a case where photographing is performed in a lofty place, exposure time is no longer stably obtained or unevenness of exposure is caused, which results in an extremely significant problem. Thus, in the case of the first embodiment, in order to make the contact area between the blade 40 of the second blade and the intermediate plate 2 in the overlap state seem efficiently small in terms of an overall configuration, the contour forming edge 2b of the intermediate plate 2 is made arc-like.

That is, the positions of both upper ends of the intermediate plate 2 are set as in the related art in order to provide the convenience of attachment to the shutter base plate 1 or in order to keep the attachment portion from interfering with the operation of the blades. The reason why the contour forming edge 2b is formed in the shape of an arc is because consideration is made such that the contact area between the blade 40 and the intermediate plate 2 is made small to make a frictional resistance force small, thereby smoothing and stabilizing the start of the operation of the slit forming blade 43 and such that, when the operation starts, inclination in a right-and-left direction does not easily occur in the slit forming blade 43. In the first embodiment, the contour forming edge 2b is formed in the shape of an arc. However, the contour forming edge of the invention is not limited to the arc shape. If the contour forming edge is formed substantially in the shape of a chevron as a whole toward the exposure opening, the whole or a portion of the contour forming edge may be formed linearly.

Here, return is made to the description of the exposure operation using the first blade and the second blade. In the first blade and the rear edge in the first embodiment, slits are formed at predetermined intervals as described above to expose the imaging surface of the imaging element. However, as is well known, it is required that the amount of exposure is the same even in any regions of the imaging surface. Meanwhile, even if a shutter unit is manufactured according to predetermined standards when being manufactured, when the shutter unit is assembled into a camera body or after a camera is sold, distribution of the amount of exposure of the imaging surface may not be constant, and unevenness of exposure may occur. Thus, a camera including the focal plane shutter of the first embodiment can correct the unevenness of exposure automatically, even if such a situation occurs.

Thus, in order to allow for such correction, in the first embodiment, as described above, the two photoelectric sensors 44 and 45 are attached to the shutter base plate 1, the arm 32 of the first blade is formed with the light-shielding portions 32a and 32b, and the arm 38 of the second blade is formed with the light-shielding portions 38a and 38b. Thus, slit width is detected at three places including a place when the slit formed by the slit forming blade 37 of the first blade and the slit forming blade 43 of the second blade is in an upper region of the opening portion 1a, and a place when the slit is in a middle region thereof, and a place when the slit is in a lower region thereof.

The detection of the slit width in the respective regions is performed by detecting the time until the light-shielding portion 38a of the arm 38 retreats from the optical path of the photoelectric sensor 45 after the light-shielding portion 32a of the arm 32 retreats from the optical path of the photoelectric sensor 44 in the case of the upper region, by detecting the time until the light-shielding portion 38b of the arm 38 cuts off the optical path of the photoelectric sensor 45 after the light-shielding portion 32b of the arm 32 cuts off the optical path of the photoelectric sensor 44 in the case of the middle region, and by detecting the time until the light-shielding portion 38b of the arm 38 retreats from the optical path of the photoelectric sensor 45 after the light-shielding portion 32b of the arm 32 retreats from the optical path of the photoelectric sensor 44 in the case of the lower region. Then, correction is made on the basis of these detection results, such that the amounts of exposure in three places become appropriate amounts of exposure.

The correction based such detection results of the slit width may be made, for example, by performing the next photographing with appropriate exposure such that a control circuit on the side of a camera electrically finely adjusts the timing at which an electric current applied to the coil 20b of the electromagnet 20 for a second blade is cut off. However, in the case of a digital camera, it is also possible to perform correction by calling information on an image photographed at the time of detection from a storage device to an image processing circuit on the side of a camera body, and to adopt the image information after the correction as final image information, and newly store the image information in the storage device.

The four blades 34 to 37 of the first blade and the four blades 40 to 43 of the second blade form a slit and move downward between the slit forming blades 37 and 43. However, the exposure operation of the first blade is stopped as the driving pin 10c of the driving member 10 for a first blade abuts on the shock-absorbing member 4 immediately after the four blades 34 to 37 are brought into an overlap state and retreat from the opening portion 1a to the lower position thereof, and the exposure operation of the second blade is stopped as the driving pin 11b of the first driving member 11 for a second blade abuts on the shock-absorbing member 5 immediately after the four blades 40 to 43 are brought into a development state and fully close the opening portion 1a. That state is the state shown in FIGS. 1 and 3. As already described, the setting operation is performed immediately after imaging information is stored in the storage device in this state. However, in parallel to this, a movable mirror provided on the side of a camera body returns to the inside of the photographing optical path.

Second Embodiment

Figure 11:
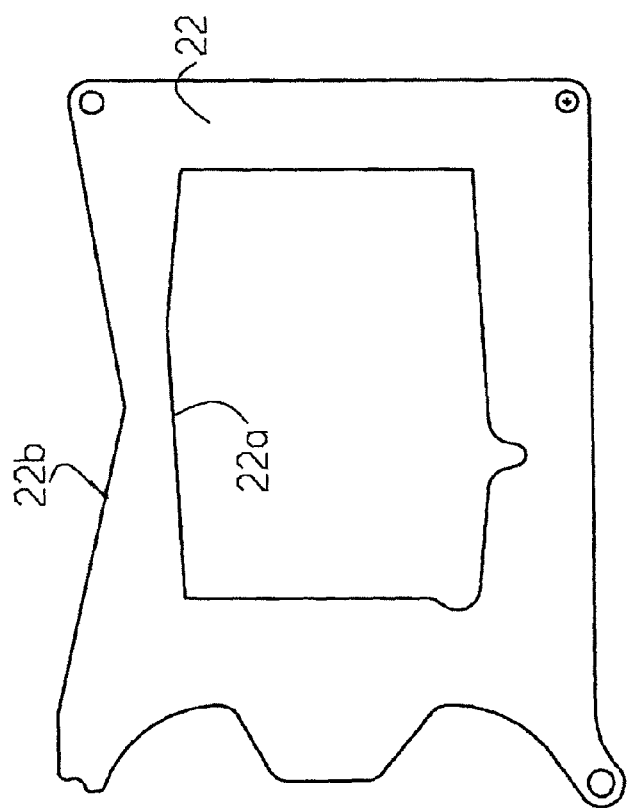
FIG. 11 is a plan view showing a single part of an intermediate plate according to a second embodiment.

A second embodiment will be described with reference to FIG. 11. FIG. 11 shows an intermediate plate 22 shown in the same manner as FIG. 2. According to the structure of the second embodiment, only the shape of the intermediate plate 22 is different from the first embodiment. Other structure and operation are the same as the first embodiment and thus its description is omitted.

The attaching structure and the shape of the intermediate plate 22 according to the second embodiment will be described. In the same manner as the intermediate plate 22 according to the first embodiment, the intermediate plate 22 is attached to the shutter base plate 1 by attachment holes formed at an upper right corner, a lower left corner and a lower right corner of the intermediate plate 22. The shape of the contour forming edge which becomes the left of the opening portion 2a is formed in a complicated shape so as to avoid (evade) the operation loci of two driving pins. Further, the shape of the contour forming edge 22b which becomes the upper portion of the opening portion 22a is formed in a substantially V shape in which straight lines extend toward the opening portion 22a, that is, the opening portion 1a which becomes the exposing opening and which is convex toward the opening portion 22a side. With this structure, the contour forming edge can be formed by a straight line, and the cost of manufacturing the intermediate plate 22 can be suppressed.

Third Embodiment

Figure 12:
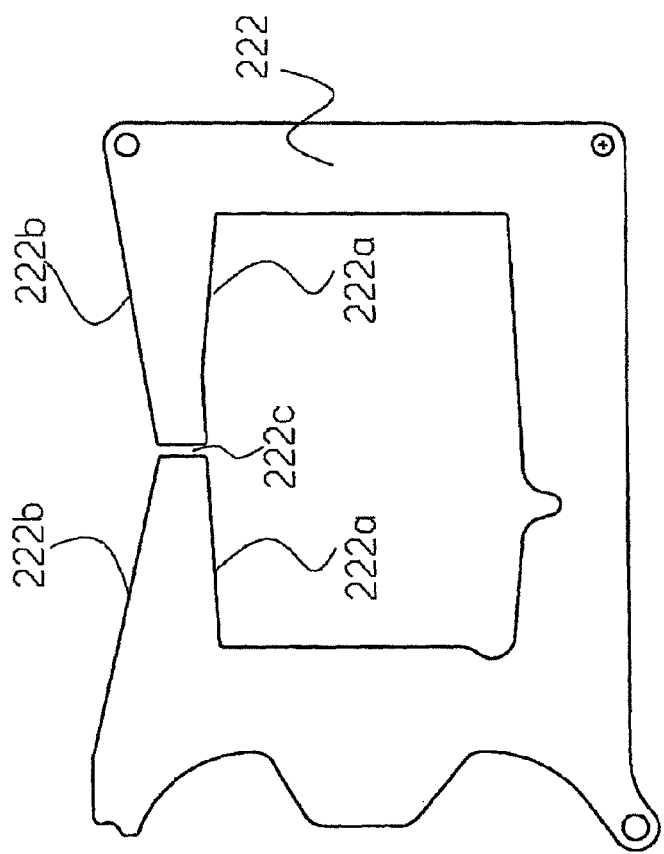
FIG. 12 is a plan view showing a single part of an intermediate plate according to a third embodiment.

Next, a third embodiment will be described with reference to FIG. 12. FIG. 12 shows an intermediate plate 222 shown in the same manner as FIG. 2. According to the structure of the third embodiment, only the shape of the intermediate plate 222 is different from the first and second embodiments. Other structure and operation are the same as in the first and second embodiments and thus its description is omitted.

The shape of the intermediate plate 222 according to the third embodiment will be described. The shape of the contour forming edge 222b which becomes an upper portion of the opening portion 222a is convex toward the opening portion 222a side, that is, the opening portion 1a which becomes the exposure opening. In the intermediate plate 222 of the third embodiment, an upper region of the opening portion 222a is formed with a slit 222c which is perpendicular to a long side of the opening portion 1a which becomes the exposure opening and which runs from the counter forming edge 222b to the opening portion 222a. Thus, the upper region of the opening portion 222a is divided by the slit 222c.

With this structure, in the photographing standby state, mutual frictional resistance force between the blade portion 40 overlapped with the three blades 41 to 43 and the intermediate plate 22 at the upper region of the opening portion 222a can be further made smaller than that of the first and second embodiments. Specifically, since the upper region of the opening portion 222a can easily warp in a direction of the optical axis, the force in which the intermediate plate 222 presses the overlapped blades becomes small and the frictional resistance force can be further made small.

Although the first to third embodiments applies the invention to the locking type focal plane shutter as described in JP-A-2008-164805, it is needless to say that the invention can also be applied to a direct type focal plane shutter as described in JP-A-2008-216484 and JP-A-2007-298544 and can also be applied to a focal plane shutter having a motor as a drive source, as described as a second embodiment in JP-A-2004-264468.

As already described, the focal plane shutter described as the second embodiment in JP-A-2004-264468, similarly to the case of the embodiments of the present disclosure, can operate the first shutter blade to the overlap state from the development state and operate the second shutter blade to the development state from the overlap state whenever photographing is performed in an exposure operation. Besides, the focal plane shutter can operate the second shutter blade to the overlap state from the development state and operate the first shutter blade to the development state from the overlap state, in the next photographing operation, in a case where the first shutter blade is operated to the overlap state from the development state and the second shutter blade is operated to the development state from the overlap state in the previous photographing operation. Accordingly, in a case where the exposure operation as in the latter case is performed, it is effective if the contour forming edge of the invention is not applied only to the contour forming edge outside one long side of an exposure opening as in the embodiments of the present disclosure but is also applied to a contour forming edge outside the other long side.

Moreover, in the focal plane shutter described in JP-A-2007-298544, the image of a subject to be photographed is observable by a monitor via an imaging element before photographing, and if the release button of the camera is pushed when photographing is performed, the exposure operation using the first blade and the second blade may be performed after the first blade returns to the development state from the overlap state. Even in the case of the locking type focal plane shutter described in the embodiments of the present disclosure or JP-A-2008-164805, it is possible to make the focal plane shutter the same operation by providing the configuration of the driving member for a first blade like the configuration described in JP-A-2007-298544. It is also possible to make the focal plane shutter of the second embodiment described in JP-A-2004-264468 perform the same operation. Therefore, even in a case where such an operation is made to perform, it is effective if the contour forming edge of the invention is not applied only to the contour forming edge outside one long side of an exposure opening but is also applied to a contour forming edge outside the other long side.

Incidentally, first to fourth regions of the intermediate plate may correspond to regions around the opening portion 2a, 22a, 222a of the embodiment. Specifically, the first region extending along a long side of the exposure opening may correspond to one of an upper part and a lower part of the opening portion 2a, 22a, 222a. The second region extending along a long side of the exposure opening may correspond to the other one of the upper part and the lower part of the opening portion 2a, 22a, 222a. The third region extending along a short side of the exposure opening may correspond to one of a right part and a left part of the opening portion 2a, 22a, 222a. The fourth region extending along a short side of the exposure opening may correspond to the other one of the right part and the left part of the opening portion 2a, 22a, 222a.

Further, the third region of the intermediate plate may include a corner region of the exposure opening defined between the third region and the first region and a corner region of the exposure opening defined between the third region and the second region. In the same way, the fourth region of the intermediate plate may include a corner region of the exposure opening defined between the fourth region and the first region and a corner region of the exposure opening defined between the fourth region and the second region.

What is claimed is:

1. A focal plane shutter for a camera, comprising:
    a shutter base plate having an opening portion for a photographing path;
    an auxiliary base plate having an opening portion for the photographing path and attached to the shutter base plate at a predetermined interval;
    an intermediate plate arranged between the shutter base plate and the auxiliary base plate to form a first blade chamber between the intermediate plate and the shutter base plate and form a second blade chamber between the intermediate plate and the auxiliary base plate, the intermediate plate having an opening portion for the photographing path, wherein at least one of the opening portions of the shutter base plate, the auxiliary base plate and the intermediate plate forms an oblong exposure opening, and wherein the intermediate plate defines first and second regions extending along long sides of the exposure opening, respectively, and third and fourth regions extending along short sides of the exposure opening, respectively;

a first shutter blade arranged in the first blade chamber and including a plurality of first blades for opening and closing the exposure opening, the plurality of first blades being overlapped with each other so as to be substantially parallel to the long side of the exposure opening in the first region of the intermediate plate when the exposure opening is opened; and a second shutter blade arranged in the second blade chamber and including a plurality of second blades for opening and closing the exposure opening, the plurality of second blades being overlapped with each other so as to be substantially parallel to the long side of the exposure opening in the second region of the intermediate plate when the exposure opening is opened, wherein the intermediate plate is formed such that at least one of two contour forming edges outside the first and second regions has a convex shape, the apex of which is formed substantially at a center portion in a length direction of the first and/or second blades, and the apex is directed toward the exposure opening, wherein the convex shape is a substantially symmetrical shape about the apex in the length direction, and wherein, when the plurality of first blades or the plurality of second blades are overlapped with each other so as to be substantially parallel to the long side of the exposure opening in the first or second region of the intermediate plate when the exposure opening is opened, the plurality of first blades or the plurality of second blades are overlapped with the apex of the convex shape of the intermediate plate.

2. The focal plane shutter according to claim 1, wherein at least one of the two contour forming edges of the first and second regions is formed in the shape of an arc which is convex toward the exposure opening.

3. The focal plane shutter according to claim 1, wherein the first shutter blade includes two first arms each of which is pivotally attached to the shutter base plate in the third or the fourth region of the intermediate plate, the first blades are arranged closer to the intermediate plate than the first arms and each of the first blades is pivotally supported by the first arms, the second shutter blade includes two second arms each of which is pivotally attached to the shutter base plate in the third or the fourth region of the intermediate plate, and the second blades are arranged closer to the intermediate plate than the second arms and each of the second blades is pivotally supported by the second arms.

4. The focal plane shutter according to claim 1, wherein at least one of the contour forming edges of the first and second regions is formed in a substantially V shape which is convex toward the exposure opening.

5. A focal plane shutter for a camera, comprising:
a shutter base plate having an opening portion for a photographing path;
an auxiliary base plate having an opening portion for the photographing path and attached to the shutter base plate at a predetermined interval;
an intermediate plate arranged between the shutter base plate and the auxiliary base plate to form a first blade chamber between the intermediate plate and the shutter base plate and form a second blade chamber between the intermediate plate and the auxiliary base plate, the intermediate plate having an opening portion for the photographing path, wherein at least one of the opening portions of the shutter base plate, the auxiliary base plate and the intermediate plate forms an oblong exposure opening, and wherein the intermediate plate defines first and second regions extending along long sides of the exposure opening, respectively, and third and fourth regions extending along short sides of the exposure opening, respectively;
a first shutter blade arranged in the first blade chamber and including a plurality of first blades for opening and closing the exposure opening, the plurality of first blades being overlapped with each other so as to be substantially parallel to the long side of the exposure opening in the first region of the intermediate plate when the exposure opening is opened; and
a second shutter blade arranged in the second blade chamber and including a plurality of second blades for opening and closing the exposure opening, the plurality of second blades being overlapped with each other so as to be substantially parallel to the long side of the exposure opening in the second region of the intermediate plate when the exposure opening is opened, wherein:
the intermediate plate is formed such that at least one of two contour forming edges outside the first and second regions has a convex shape toward the exposure opening;
the contour forming edges of one of the first and second regions are formed in a convex shape toward the exposure opening; and
the one of the first and second regions is divided by a slit which is perpendicular to the long side of the opening portion.

* * * * *